US007840579B2

(12) United States Patent  (10) Patent No.: US 7,840,579 B2
Samuelson et al.  (45) Date of Patent: Nov. 23, 2010

(54) MOBILE DEVICE RETRIEVAL AND NAVIGATION

(75) Inventors: Mark Samuelson, Seattle, WA (US);
Pim Van Meurs, Kenmore, WA (US);
Michael R. Longe, Seattle, WA (US)

(73) Assignee: Tegic Communications Inc., Seattle, WA (US)

( * ) Notice: Subject to any disclaimer, the term of this patent is extended or adjusted under 35 U.S.C. 154(b) by 450 days.

(21) Appl. No.: 11/609,697

(22) Filed: Dec. 12, 2006

(65) Prior Publication Data

US 2007/0156747 A1 Jul. 5, 2007

Related U.S. Application Data

(60) Provisional application No. 60/749,031, filed on Dec. 12, 2005, provisional application No. 60/771,887, filed on Feb. 10, 2006.

(51) Int. Cl.
G06F 7/00 (2006.01)
G06F 17/30 (2006.01)
(52) U.S. Cl. .................... 707/758; 707/999.005
(58) Field of Classification Search ............. 707/5, 707/758; 704/251
See application file for complete search history.

(56) References Cited

U.S. PATENT DOCUMENTS 6,181,867 B1* 1/2001 Kenner et al. ............... 386/46
7,103,534 B2* 9/2006 Goodman ..................... 704/9
7,254,622 B2* 8/2007 Nomura et al. ............. 709/219
7,380,724 B2* 6/2008 Unruh ..................... 235/472.01
7,385,531 B2* 6/2008 Zhang ......................... 341/28
7,385,591 B2* 6/2008 Goodman ................. 345/172
2002/0049795 A1* 4/2002 Freeman .................... 707/531
2002/0052900 A1* 5/2002 Freeman .................... 707/531
2002/0183100 A1* 12/2002 Parker ....................... 455/566
2005/0162395 A1* 7/2005 Unruh ....................... 345/169
2005/0190973 A1* 9/2005 Kristensson et al. ........ 382/229
2006/0028450 A1* 2/2006 Suraqui ..................... 345/169
2007/0016862 A1* 1/2007 Kuzmin .................... 715/700
2007/0094024 A1* 4/2007 Kristensson et al. ........ 704/252
2007/0100619 A1* 5/2007 Purho ....................... 704/239

OTHER PUBLICATIONS

PCT International Search Report and Written Opinion issued in International Application No. PCT/US06/46987 mailed Jul. 7, 2008, 8 pages.

* cited by examiner

Primary Examiner—Jean B. Fleurantin
Assistant Examiner—Joshua Bullock
(74) Attorney, Agent, or Firm—Chapin IP Law, LLC; Barry W. Chapin, Esq.

(57) ABSTRACT

In one general aspect, information is presented to a user by receiving a first input from a user and structuring the first input as a first stem. A separator is received designating subsequently-received input as a second input. The second input is received and the second input is structured as a second stem. The first stem and the second stem are related to a library of candidates. One or more results are rendered in response to relating the first stem and the second stem to the library of candidates and the user is enabled to select from among the one or more results.

59 Claims, 25 Drawing Sheets

Chinese Stroke, below

2620

Chinese Stroke, superimposed

2630

Korean jamos, adjacent

MOBILE DEVICE RETRIEVAL AND NAVIGATION

CROSS-REFERENCE TO RELATED APPLICATIONS

This application claims priority to U.S. Provisional Application No. 60/749,031, filed Dec. 12, 2005, and titled "Mobile Device Retrieval and Navigation"; and U.S. Provisional Application No. 60/771,887, filed Feb. 10, 2006, and also titled "Mobile Device Retrieval and Navigation." Each of these applications is incorporated by reference.

TECHNICAL FIELD

This document relates to content retrieval and presentation.

BACKGROUND

The Internet enables users to access a great amount of information. A user with a web browser, a messaging application, or another proprietary application may retrieve information from large libraries to access great amounts of information. Navigating the great amount of information can, however, challenge some users.

SUMMARY

In one general aspect, information is presented to a user by receiving a first input from a user and structuring the first input as a first stem. A separator is received designating subsequently-received input as a second input. The second input is received and structured as a second stem. The first stem and the second stem are related to a library of candidates. One or more results are rendered in response to relating the first stem and the second stem to the library of candidates and the user is enabled to select from among the one or more results.

Implementations may include one or more of the following features. For example, each of receiving the first input, the separator, and the second input may include receiving key inputs on a reduced-entry keypad. Receiving the first and second inputs may include receiving one or more key inputs on a reduced entry keypad where one or more of the key inputs represents a plurality of possible characters.

Receiving the separator may include receiving the separator as a single key input on a reduced-entry keypad. Receiving the first input or the second input may include receiving speech inputted by a user.

Relating the first stem and the second stem to the library of candidates may include searching a database of objects, where each object is associated with one or more strings, by identifying matches between the first stem and a first string and the second stem and a second string. Identifying matches between the first stem and the first string and the second stem and the second string may include identifying matches between the first stem and the first string that appear as the first portion of a phrase of more than word and between the second stem and the second string that appear in a second portion of the phrase.

Identifying matches between the first stem and the first string and the second stem and the second string may include identifying matches between the first stem and the first string that appear in a first attribute and between the second stem and the second string that appear in a second attribute that is different than the first attribute.

Rendering the one or more results in response to relating the first stem and the second stem to the list of candidates may include rendering the results ordered by the likelihood each object in the results represents the actual object desired by the user. Rendering the one or more results in response to relating the first stem and the second stem to the library of candidates may include rendering an entry responsive to the first and second stems and an action associated with the entry object.

Receiving the separator may include receiving the separator in response to determining that the user has selected a different entry mode. Determining that the user has selected the different entry mode may include determining that the user has switched from using voice input system to entering to using a keypad for input. Receiving the first input may include receiving a sequence of characters that represents a word that has been completely entered. Receiving the first input may include receiving a sequence of characters that represents a word that has been partially entered.

Relating the first stem and the second stem to the library of candidates may include associating a string with an object that includes a synonym for a string already associated with an object and identifying the object as one of the results based on determining that the first stem or second stem matches the string including the synonym.

The results may be sorted into two or more predetermined types of data or applications and the results may be rendered in a tabbed user interface including multiple tabs that each correspond to the two or more predetermined types of data or applications. The user may be enabled to select one of the multiple tabs to perceive which of the results are selectively rendered responsive to the selected tab on the tabbed user interface.

An action may be rendered as an object in the results related to a command accessible through a menu system. The user may be transferred into the menu system so that the action may be commenced in response to receiving a confirmation instruction from the user. The action related to the command accessible through the menu system may be automatically commenced in response to receiving a selection from the user.

An active stem presently being entered that may be updated through receipt of additional input may be designated. The active stem is identified within an object as the results as the results are rendered. The active stem may be distinguished from a passive stem using a special graphical designator. Distinguishing the active stem from the passive stem may include underlining the active stem in the object using a first color and underlining the passive stem in the object using a second color.

It may be determined that the first stem or the second stem is found within a particular attribute for an object in the library of candidates. A display metric is used for the object that is based on determining whether the first stem or the second stem is found within the particular attribute for the object. The display metric is used to determine an order in which the results are rendered and the results may be rendered based on the order.

The display metric may be adjusted to reflect that an object has been selected by the user. The display metric for other objects associated with the particular attribute may be adjusted based on a determination that the user is prefers to input data related to the particular attribute.

A character likelihood metric is determined for each of one or more characters appearing within the first stem and an object likelihood metric is determined for different objects related to the stem using the character likelihood metric. The object likelihood metric is used to determine an order in which results are rendered and the results is rendered based on the order.

Additional input may be received and structured as one or more additional stems. The first stem, the second stem, and the additional stems may be related to the library of candidates. The rendered results are updated in response to receiving the additional input.

In another aspect, information is presented to a user by receiving one or more ambiguous inputs that may be resolved to one of at least two disambiguated characters. The ambiguous inputs are analyzed. Results are generated that reflect disambiguated terms related to the ambiguous inputs. The results are sorted into two or more predetermined types of data or applications and a tabbed user interface is rendered that includes multiple tabs that each correspond to the two or more predetermined types of data or applications. The results are rendered using the tabbed user interface in a manner enabling the user to perceive which of the results are rendered responsive to a selection of a selected tab on the tabbed user interface. The user is enabled to select an aspect of the results to invoke an operation.

Implementations may include one or more of the following features. For example, rendering the tabbed user interface may include rendering a default icon that a user may select a default mode for input. Rendering the tabbed user interface may includes rendering a disambiguation icon that the user may select to use a disambiguation mode for input. Rendering the disambiguation icon may include launching a code segment that uses predictive software to enable identification of a letter with a single key tap when selected.

An audio dictionary of terms related to the results may be accessed and one or more audio inputs may be received. The audio inputs using the audio dictionary are analyzed and the results are revised in response to analyzing the audio inputs. Rendering the results using the tabbed user interface may include generating a tab for one of the predetermined types of data or applications that is included in the results.

In still another aspect, information is presented to a user by receiving a input from a user and structuring the input as one or more stems. The stems are related to a library of candidates. A processor determines that the stems are found within a particular attribute for an object in the library of candidates. A display metric is used for the object that is based on determining whether the stems are found within the particular attribute for the object to determine an order in which the results are rendered. The results are rendered based on the order.

In yet another aspect, information may be presented to a user by receiving input from a user and structuring the input as one or more stems. The stems are related to a library of candidates. A character likelihood metric is determined for each of one or more characters appearing within the stems. An object likelihood metric is determined for different objects related to the stems using the character likelihood metric. The object likelihood metric is used to determine an order in which results are rendered and the results are rendered based on the order.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 16 also illustrates the use of icons to provide an indicate of an application invoked in response to selecting a particular result.

FIGS. 23a-23e illustrate how a mobile device may be configured to present information with a tabbed user interface enabling results to be sorted.

DETAILED DESCRIPTION

Figure 1:
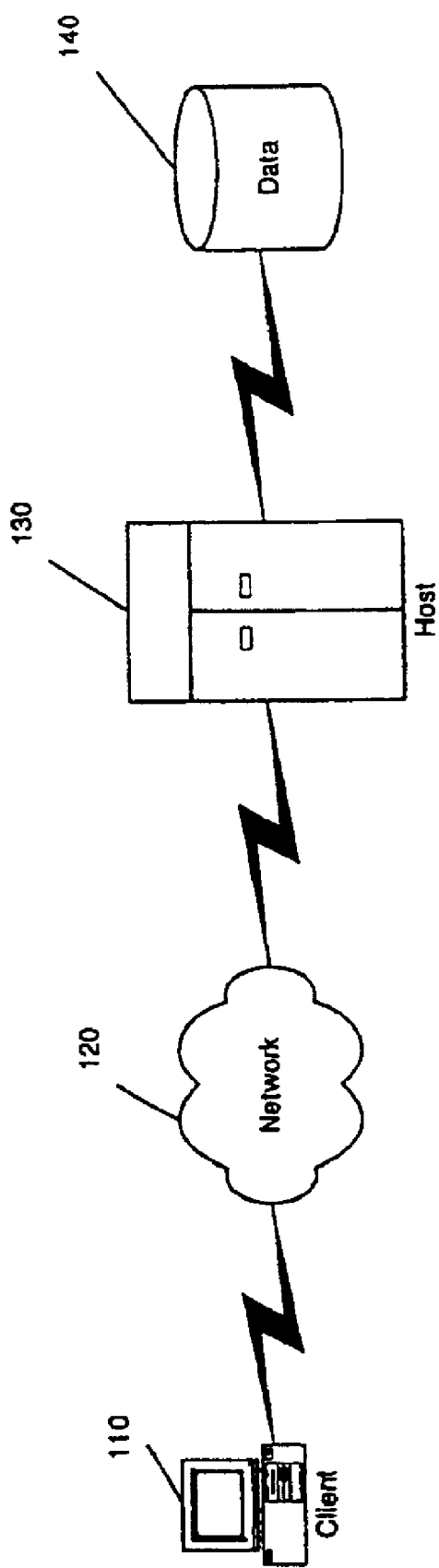
FIG. 1 illustrates a communications system that may be used to intelligently present results related to a character stream analyzed by a host.

A key challenge in providing an improved experience for users accessing the Internet and its large content reserves is enabling the users to access information most relevant to their interests with the least amount of effort in retrieving the results. This challenge is pronounced when users operate devices that have ambiguous input systems, such as wireless phones that have reduced-size keyboards. For example, a user relying on a wireless phone with a reduced size keypad (e.g., a 12 key touchpad where a "2" button also represents "A", "B", and "C") may find it difficult to access an application predicated upon entry of one or more characters.

To assist users who enter ambiguous input, it is possible to resolve the ambiguous input into several potential disambiguated candidates and to enable user selection among those candidates. Furthermore, in addition to providing the user with an indication of the disambiguated candidates, applications and/or related actions may be provided in addition or as an alternative to presenting the disambiguated candidates.

More specifically, for instance, a user may enter a sequence of one or more ambiguous inputs on a device such as a wireless phone. The ambiguous inputs may be analyzed and results may be generated in response. The results may be related to several disambiguated terms and also related to more than one user applications. For example, user entry of "733" on a 12 key alphanumeric keypad on wireless phone may be analyzed and resolved to terms relating to or including "RED". The term "RED" may in turn be related to different applications, such as a mapping application related to Redondo Beach, a sports application related to the Washington Redskins, and/or a directory service application related to Red Lobster. The results are rendered in a manner enabling the user to perceive which one of the several user applications are available for user selection/launch. For example, a wireless phone may indicate that selection of a first result launches a mapping application and selection of a second result launches a directory service application. Finally, the user is made able to select one of the disambiguated terms to launch one of the user applications related to the selected result. For example, a user on a wireless phone may use arrow keys and a selection button to launch a mapping application that provides driving direction in Redondo Beach.

In another example, a user on a wireless phone may enter "23212" as a sequence of characters on a QWERTY thumbboard. The wireless phone may provide the results to a host for analysis. The host may retrieve maps and directory service information related to "23212". Note that in this example, the user did not identify a mapping label, dialing information, or include the words "zip code" to retrieve the results for zip code 23212. Rather, the sequence of characters is analyzed and used to determine that an input of its content or form may correspond to this form or type of input and thus may be used to inspire consideration or display of potential mapping results may be considered and/or displayed.

The user may find that desired results can be accessed more efficiently (e.g., by entering fewer keys) if the user is able to input data related to a first portion of a object and also enter data related to a second portion of the object. Thus, a first input is received from a user and structured as a first stem. A separator is received designating subsequently-received input as a second input and the second input is received and structured as a second stem. For example, a user on a wireless phone may be interested in locating information related to Major League Baseball's Seattle Mariners. Rather than entering an entire string "Seattle" before entering the string "Mariners", the user may enter a few characters as a first stem (e.g., "732" on a 12-key phone related to "Seattle"), and then enter a separator (e.g., a "#" key) to indicate that the next characters should be processed as a second stem that relates to a different portion of the object (e.g., "627" on a 12-key phone for "Mariners"). The wireless phone receiving the first stem and the second stem relates "732" and "627" to a library of candidates (e.g., a database on a communications network or on the wireless phone itself). The wireless phone then renders results in response. Thus, the wireless phone may include a link to a telephone listing for the Seattle Mariners, a link for a mobile web site for the Seattle Mariners, in addition to other information (e.g., "Pebble Beach Marina"). The user then may select from among the one or more results.

Even though the sequence of ambiguous inputs may relate to a variety of applications and/or be resolved to multiple disambiguated terms, the results may be displayed in such a manner that the user may select one of the results to launch an application or a code segment related to the selected item. For example, if the displayed results include a list of plumbers available to support the user, selecting one of the entries may launch a web page operated by a particular plumber. In another example, a phone call, an electronic mail message or an instant message may be transmitted to the plumber whose entry was selected from the results. In yet another example, the user may insert a result as an object (e.g., an attachment, link or word) in a message.

The user may continue to enter one or more ambiguous inputs or characters, and the results may be modified based on recently received ambiguous inputs or characters. For example, in one implementation, when a character stream is analyzed initially after entering "spring", results related to the season of spring and products using the term "spring" may be returned. When the user types a "f" character (or the "3DEF" key), the additional input may be transmitted to the host, which in turn generates results related to "springf". In one example, the previous results related to "spring" are filtered to generate a new list that only includes content related to "springf". In another example, a new query is run identifying terms related to "springf".

Regardless of how the query is structured, a host identifies results related to "springf", which may include one or more selections related to cities and towns named Springfield. Results for multiple towns may be presented in a portion of the application that the user is accessing. In one example, the user may be allowed to select one of the results to generate a map related to the selected Springfield. In another example, the user may be presented with entries for "Springfield, Mass." and "Springfield, Ill." The user may continue typing characters in the character stream. When the user types in an "I" character after "Springfield" has been identified, the "Springfield, Mass." entry may be removed. The user then may select the "Springfield, Ill." entry to retrieve a map of Springfield, Ill.

FIG. 1 shows a communications system 100 that enables intelligent presentation of results related to an input stream. Generally, a client 110 exchanges communications relating to an input stream with a host 130 using network 120. The host 130 analyzes the character stream to generate results related to the character stream using, for example, a database 140 (e.g., a yellow pages directory or a mapping system). The host 130 provides one or more results to the client 110, which in turn displays the results.

Generally, the client 110 includes a computing device that enables a user to exchange information over a communications network. The client 110 may include one or more devices capable of accessing content on the host 130. The client 110 also may include a controller (not shown) that processes instructions received from or generated by a software application, a program, a piece of code, a device, a computer, a computer system, or a combination thereof, which independently or collectively direct operations of the client 110. The instructions may be embodied permanently or temporarily in any type of machine, component, equipment, storage medium, or propagated signal that is capable of being delivered to the client 110 or that may reside with the controller at client 110. Client 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, or other integrated client) capable of receiving one or more data units. The information retrieval applications may run on a general-purpose operating system and a hardware platform that includes a general-purpose processor and specialized hardware for graphics, communications and/or other capabilities. In another implementation, client 110 may include a wireless telephone running a discovery application on a reduced operating system with general purpose and specialized hardware capable of operating in mobile environments.

The client 110 includes one or more input stream code segments that analyze a stream input to an information retrieval application. The input stream code segment receives the stream and structures the exchange of the input stream with other software applications on the client 110 and/or host 130. For example, the input stream code segment may wait initially wait until X initial inputs are received before sending a transmission to the host 130. The input stream code segment then may send updates to the host every Y subsequent inputs. Alternatively, the input stream code segment may include a delay feature set that transmits an update to the input stream if there are Z seconds of user inactivity. Thus, when X is 5 ("five") inputs, Y is 2 ("two") inputs, and Z is 1 ("one") second, the input stream code segment for a user who types in "DULLES GAS STAT." would request results 1) after "DULLE" 2) after "DULLES", "DULLES GA", DULLES GAS ", "DULLES GAS ST", and "DULLES GAS STAT". In the same example, if the user typed "DULLES GAS S" and paused for more than a second (when Z=1 second and the delay feature set is being used), the input stream code segment would send the "DULLES GAS S" string to the host for analysis.

Alternatively or in addition, a client may wait until a different condition has been met before exchanging characters with a host. For example, a client may monitor user activities to determine if the user has walked through a list of matching terms more than a threshold number of times, or to determine if the user manually selected a "MORE" button. In yet another example, a client may exchange a selected word to retrieve additional results using the selected word as basis for analysis. Thus, when the user enters "733" on a reduced-size keypad and then selects "Redskins", the client requests additional results related to "Redskins".

The client 110 may include a preliminary analysis code segment to analyze the input stream and send periodic updates. The preliminary analysis code segment screens the input stream to enhance the efficacy of the results generated for the input stream. In one example, the preliminary analysis code segment identifies one or more databases or segments likely to be associated with the predicted interest of a consumer. Thus, when "20005" is entered, the preliminary analysis code segment may instruct an instruction in the transmission to the host 130 to poll geographic information related to zip code 20005. Other examples may include the preliminary analysis code segment identifying a service industry (e.g., plumbers), a segment (e.g., online music), or a combination of factors (e.g., plumbers in zip code 20005) as relevant to the results that are sought by the user. With the preliminary factors identified, the transmission may be sent to an appropriate database, or a query may be modified as a result of performing the preliminary analysis.

In another example, the preliminary analysis code segment also may correlate information that has been learned about a user with the input stream. If the client is believed to be operating in a particular area (e.g., based on GPS data, wireless tower information, and/or billing information for the user), the input stream can be modified to instruct the host 130 that results should be responsive to the user's relative or absolute location. Similarly, the preliminary analysis code segment may interface with a cache or user history to better identify results for the user. Thus, if a history of user activity indicates that the user is interested in National Football League sporting events, the preliminary analysis code segment may tailor results based on the relationship of the results to American Football rather than International Football (soccer). The preliminary analysis code segment also may retrieve and display locally stored results before the host 130 is accessed.

The client 110 may include a communications code segment that interfaces with the information retrieval code segment (e.g., browser or key word tool) to modify the input stream results to reflect the network environment of the client. For example, when the client 110 includes a wireless phone with limited bandwidth, the communications code segment may structure the communications exchange to limit the amount of data in results that are returned so as not to overwhelm the network 120. This may include filtering the results so that no more than a specified number of results are returned. Similarly, the format of the results may be modified to reduce the bandwidth of results. For example, results transmitted to the client 110 may have the graphics or images removed from the application.

The client may include a display code segment that tailors the results to a display device (e.g., a monitor or a LCD ("Liquid Crystal Display")). The display code segment may manage the presentation of results so that only the most likely results are presented. The display code segment may interface with the host 130 so that the number of results does not overwhelm the memory or display capabilities of the client. In one example, the display code segment may instruct the host 130 to transmit no more than a specified number of results. In another example, the display code segment may instruct the host 130 to not return any result items larger than a specified size.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 120 may include hardware and/or software capable of enabling direct or indirect communications between the client 110 and the host 130. As such, the network 120 may include a direct link between the client 110 and the host 130, or it may include one or more networks or subnetworks between them (not shown). Each network or subnetwork may include, for example, a wired or wireless data pathway capable of carrying and receiving data. Examples of networks include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 130 is generally capable of executing instructions under the command of a host controller (not shown). The host 130 may include one or more hardware components and/or software components. An example of a host 130 is a general-purpose computer (e.g., a server or a mainframe computer) capable of responding to and executing instructions in a defined manner. Other examples include a special-purpose computer, a workstation, a PC, a device, a component, other physical or virtual equipment, or some combination thereof capable of responding to and executing instructions.

The controller is a software application loaded on the host 130 for commanding and directing communications exchanged with the client 110. Other examples include a program, a piece of code, an instruction, a device, a computer, a computer system, or a combination thereof, for independently or collectively instructing the client 110 or the host 130 to interact and operate as described. The host 130 may be embodied permanently or temporarily in any type of machine, component, physical or virtual equipment, storage medium, or propagated signal capable of providing instructions to the client 110 or the host 130.

The controller may include one or more information providing applications to support information retrieval requests sent from the client 110. The information providing applications may include a results code segment that receives an input stream from the client 110 and generates results responsive to a predicted interest by an individual user. Thus, the results code segment may generate one or more results based on the exchange of an input stream received from a client 110.

The results code segment also may receive input stream modifiers received from the preliminary analysis code segment, the communications code segment, the display code segment, and/or other code segments that modify an input stream transmission from the client. The results code segment may process the input stream in accordance with these modifiers. The host 130 also may operate code segments that perform operations similar to the feature sets in the preliminary analysis code segment, the communications code segment, and the display code segment. These host-oriented versions of these code segments may interface with the results code segment to modify the analysis performed and/or the results that are returned. For example, the host 130 may initially access a cache of content previously requested by the user. The previously-returned results may be analyzed for relevancy before additional analysis is performed or additional systems are polled.

The host 130 may interface with a database 140 to analyze the input stream. Generally, the database 140 includes storage for a volume of data and a processing engine that enables the data to be sorted, searched, and analyzed. The database may be organized along functional criteria. For example, a mapping database may be organized by geographical region, while a yellow pages database may be organized by business as well as geographic criteria. In one example, the database may be structured to perform a more detailed analysis on an input stream provided by a host 130. For example, a host 130 may receive an input stream from a client and redirect queries to one or more databases 140. Each of the redirected queries may be modified to further refine the redirected query. For example, a query redirected to a yellow pages directory may have the zip code added as a selection term. Similarly, a query directed to a database that provides stock quotes may include a reference describing which stocks are of interest to the user (e.g., stocks owned by the user).

In some implementations, the client 110, host 130, and database 140 are all parts of a single computing device or integrated system. In that implementation, the external communications network is eliminated, though the components may still communicate via a common messaging subsystem like sockets.

Figure 2:
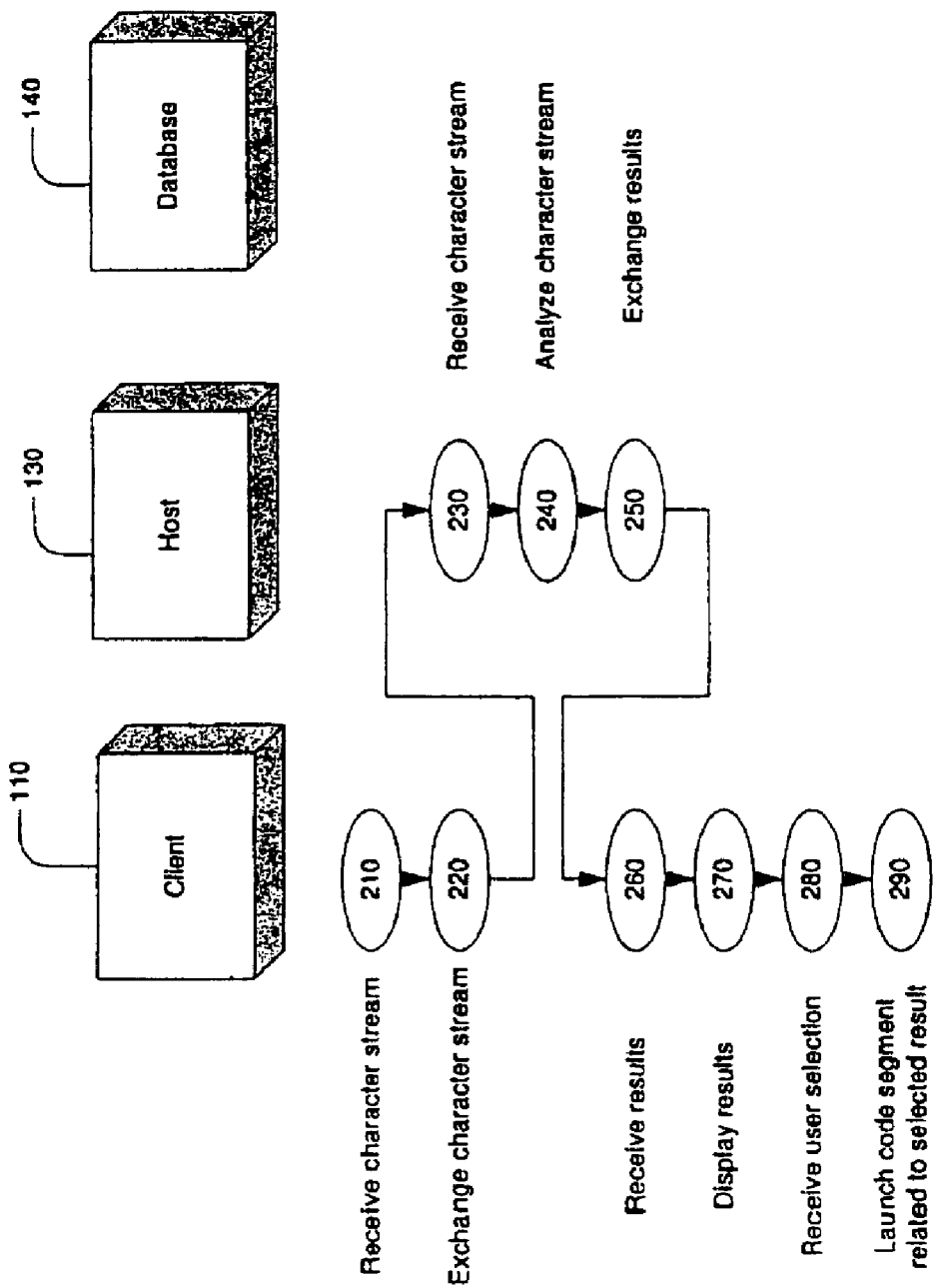
FIG. 2 is a flow chart showing how a client may use a host to intelligently present results related to a character stream.

Referring to FIG. 2, a flow chart 200 illustrates how a client 110 may use a host to intelligently present results related to an input stream. Generally, the systems in flow chart 200 relate to the systems described in FIG. 1. Flow chart 200 illustrates how the client 110 receives a character stream (step 210) and exchanges the character stream with the host (step 220). The host 130 receives the character stream (step 230), analyzes the character stream (step 240), and exchanges the results with the client 110 (step 250). The client 110 receives the results (step 260), displays the results (step 270), receives a user selection (step 280), and launches a code segment related to the selected result (step 290).

Initially, the client 110 receives a stream of one or more noncompletion characters (step 210). Generally, receiving a stream of one or more noncompletion characters includes receiving and organizing a user's keystrokes that are entered into a user application. For example, a user may be typing an entry into an address form for a web browser, or a key word entry field in a key word utility, or dialing a phone number from the mobile device's top-level screen. Receiving the stream may include structuring the stream into transmissions to be exchanged with a host 130. For example, the client application may organize the transmission into a first message after a predetermined number of inputs. The client application may structure additional messages to be created after a predetermined number of additional inputs or a predetermined time period has elapsed between the inputs. The noncompletion label indicates that the user has not indicated that the entry process has been completed. In other words, a stream with noncompletion characters indicates that additional inputs may be received to modify the search results that are displayed in response to the predicted interest of the user. In contrast, the carriage return or "Enter" key is typically used as a completion character that enables the user to expressly generate results based on the completed input stream. Additionally, the carriage return is a completion character in that additional inputs do not cause the results to be modified. On a device with a reduced-size keypad, such as a mobile phone, a special key (e.g., "down arrow") may be used to signify completion of a term in a sequence of ambiguous inputs.

Regardless of how the transmissions between the client 110 and the host 130 are structured, the client 110 sends the input stream with the host (step 220), which receives the input stream (step 230). The host 130 then analyzes the input stream (step 240). Typically, analyzing the input stream includes relating the received input stream to one or more results that are responsive to a predicted interest by the user. In one example, the input stream may be compared with metadata labels used to describe content accessible to the host 130. For example, when the input stream includes "Nashvill" as one interpretation, the host 130 may anticipate that "Nashvill" will eventually be completed to "Nashville, Tenn." and identify web pages that feature Nashville, Tenn. in the web page and/or are summarized by Metadata labels with "Nashville, Tenn.". However, the host 130 need not find identical character matches. For example, the host 130 may predict that a user entering "Nashvill" is predictive of an interest in country music. Accordingly, when the host 130 analyzes the results, the host 130 also may identify results related to country music, even if the results are not related to Nashville, Tenn. In another example that illustrates how the input stream may be analyzed using supplemental information, the results may be translated to include country music only when the host determines that the user is not from Tennessee.

Analyzing the input stream may include ranking the relative relevancy of results. For example, widely visited Nashville web sites (e.g., the Nashville Board of Tourism) may be scored as more relevant to a non-Nashville resident than a web site that includes a Nashville resident's personal web log ("blog"). The results may be generated in such a manner that the more relevant results are returned before the less relevant results.

With the input stream analyzed and the results identified, the host 130 exchanges results with the client 110. The results may be controlled so as to comply with the network or display constraints of the client. For example, if the network has limited bandwidth or the client has limited display capabilities, the host 130 may structure the transmission to avoid network congestion or may modify the results so as provide more suitable results (e.g., by removing images from the results that are returned).

The client 110 receives the results (step 260). The client 110 may perform additional processing to review the results to increase the efficacy of the display. For example, the client 110 may relate the returned results to a user profile and tailor the results to be displayed accordingly. In another example, the client may analyze the results to better develop the user profile and interests to increase the efficacy of subsequent input stream operations. Regardless of whether the results undergo intermediary processing, the client 110 displays the results (step 270). The results are presented in a manner that enables the user to select one of the results instead of completing their intended sequence of characters. For example, as a user types in an entry in a key word retrieval application, a drop down window may appear in the key word retrieval application with one or more likely results. As the user continues typing, the results appearing in the drop down window may be tailored to reflect the latest analysis of the input stream. When the user sees a result of interest, the user may select the result (step 280). Selection of a result causes the application to launch a code segment related to the selected result (step 290). For example, when the user selects a result describing a map of an area, a web browser accessing a mapping web site may be launched to display a map related to the input stream.

Figure 3:
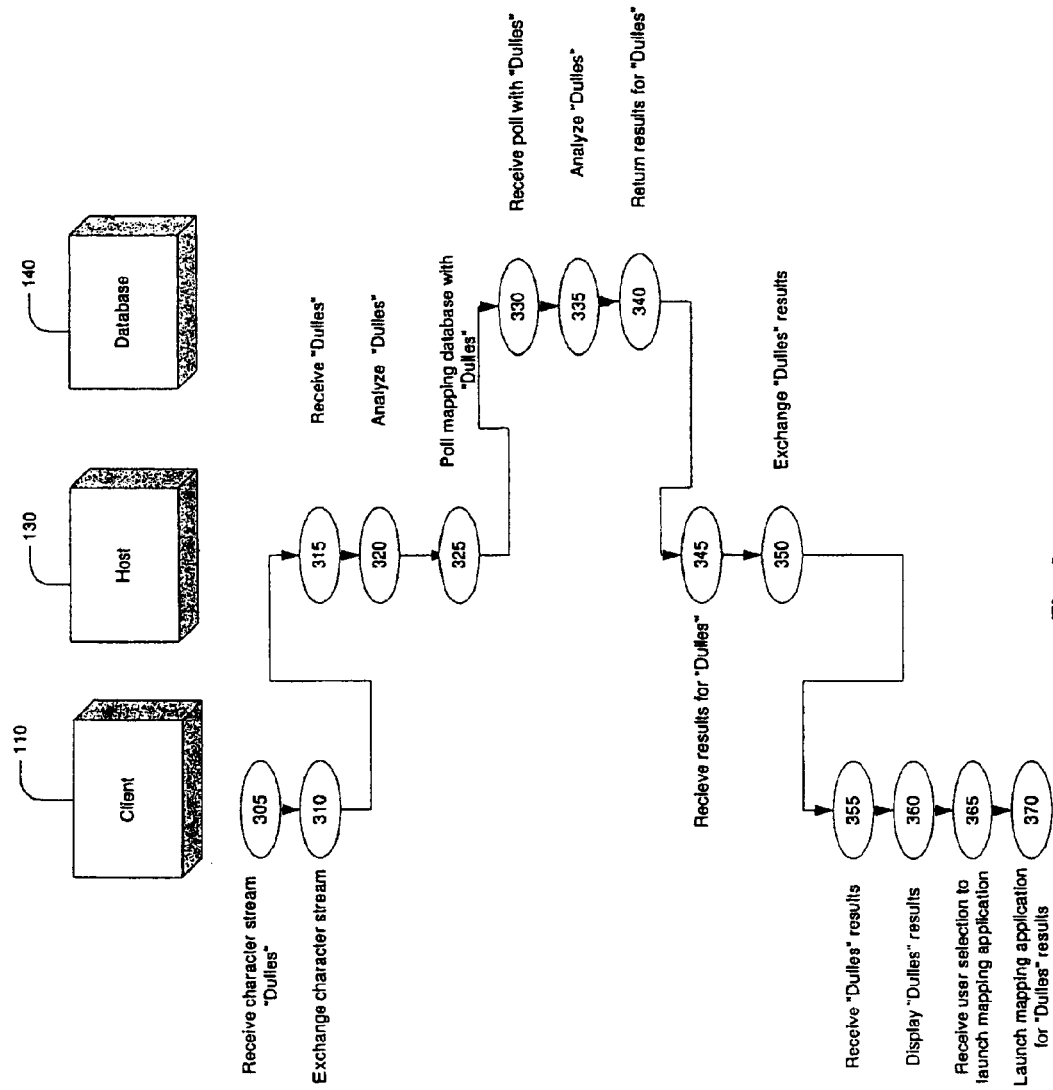
FIG. 3 is a flow chart showing how a client exchanges a character stream with a host and receives mapping information related to the character stream.

FIG. 3 shows a flow chart 300 illustrating how a client 110 exchanges an input stream with a host 130 to retrieve mapping information residing on a database 140. Generally, the systems and operations described in FIG. 3 relate to the systems and operations described previously with respect to FIGS. 1 and 2. However, FIG. 3 illustrates how the host 130 may interface with the database 140 to retrieve results for the client 110. The client 110 exchanges the input stream with the host 130. The host, in turn, uses the database 140 in its analysis of the input stream to produce results. The host provides the results to the client 110, which, in turn, presents the results and launches the appropriate code segment when the user selects the result of interest.

Initially, the user of client 110 enters the character stream "Dulles" (step 305). The client exchanges the character stream with the host 130 (step 310), which receives the character stream "Dulles" (step 315). The host 130 analyzes the character stream "Dulles" (step 320). The host 130 may perform a local analysis of a character stream to compare the character stream against popular results that are cached on the host 130, while distributing customized queries to specialized databases to identify results of greater relevance. For example, in flow chart 300, analyzing the character stream includes polling a mapping database related to "Dulles" (step 325). Although flow chart 300 depicts one database 140 being accessed, multiple databases may be polled. Examples of other databases that may be polled include, but are not limited to, messaging databases, directory services, yellow pages, and financial databases.

The database 140 receives the poll with "Dulles" (step 330). "Dulles" is then analyzed (step 335), and results are retrieved. For example, multiple maps related to Dulles, Virginia, could be identified and/or retrieved. This may include a map of Dulles Township, directions to Dulles International Airport, and directions to various corporate offices located in Dulles, Va. The results are then returned to the host 130 (step 340).

Upon receiving the results (step 345), the host 130 exchanges the "Dulles" results with the client (step 350). Exchanging the results with the client may include synchronizing results received from multiple databases and identifying the results of the greatest relevance. For example, multiple databases may be polled to analyze the character stream. The overall number of results returned from the client 110 may be too large for the client 110 to process and/or display. Accordingly, the host 130 may filter and identify only those results relevant to the host. In one example, the most relevant results are returned to the client 110, while the pool of results remains available for analysis in light of subsequently received characters in the character stream. In another example, the results from the databases are received at different times. For example, a query that precisely develops and then matches a user demographic may take longer than a query that compares the results against the most commonly retrieved results. Exchanging the results may include initially presenting the most commonly retrieved results and then subsequently presenting the results of the longer query when the results of the longer query become available.

The client receives the "Dulles" results (step 355) and displays them (step 360). As shown, when the client 110 receives a user selection to launch a mapping application related to "Dulles" (step 365), the client 110 launches a mapping application for the selected "Dulles" results (step 370).

Figure 4:
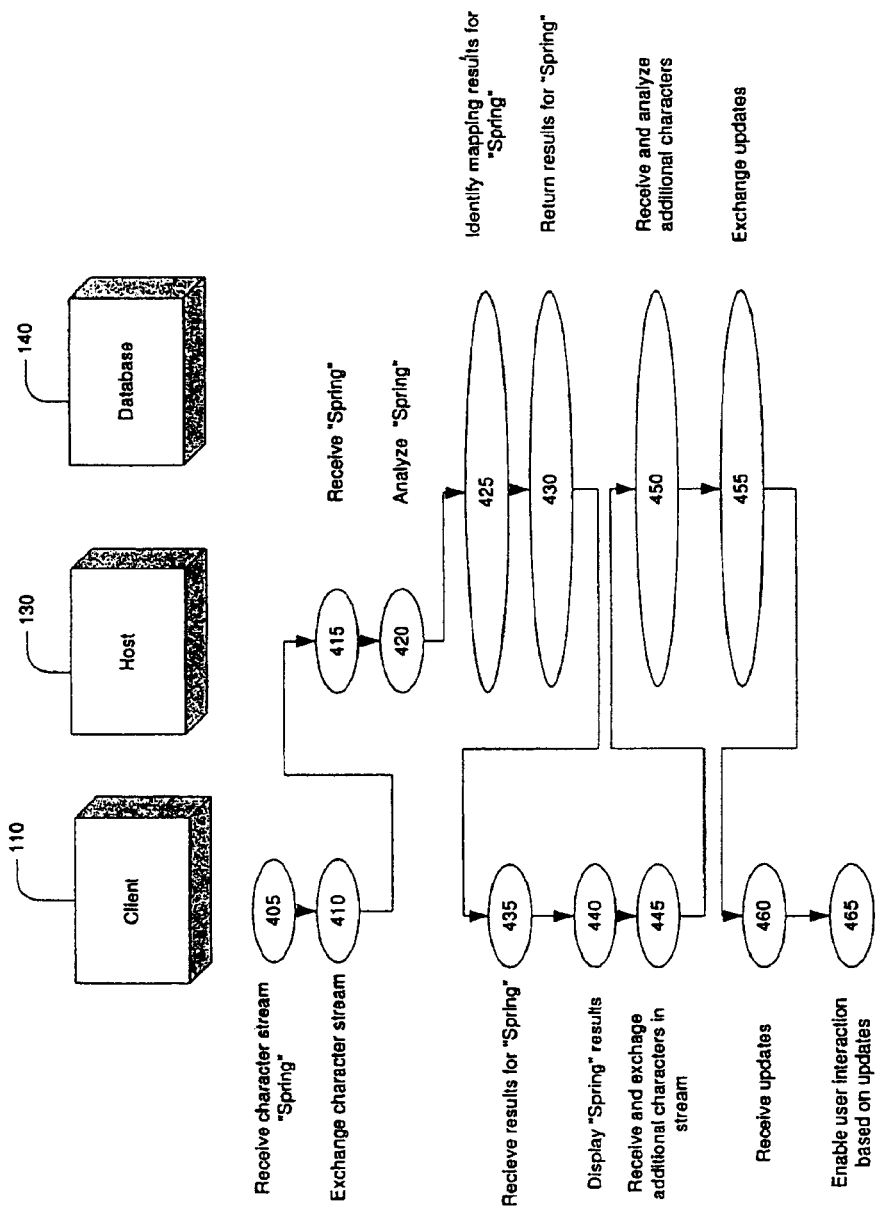
FIG. 4 is a flow chart showing how the client display may be modified based on updates to the character stream.

FIG. 4 illustrates a flow chart 400 showing how the client display may be modified based on updates to the input stream. Generally, the systems and operations shown in FIG. 4 relate to the systems and operations described previously with respect to FIGS. 1-3. However, flow chart 400 illustrates how updates to the input stream may generate different results with which the user may interact. In particular, subsequently received inputs may generate a different set of results for display by the client. In this manner, the user may modify the input stream and observe in real-time new results based on the modifications.

Initially, the client receives the character stream "Spring" (step 405), and exchanges the character stream 410 with the host 130 (step 410). The host 130 receives the character stream "Spring"(step 415) and analyzes the character stream "Spring" (step 420). The host 130 and/or the database 140 identifies mapping results for the character stream "Spring" (step 425), and returns these results to the client 110 (step 430). The client receives the results related to "Spring" (step 435) and displays them (step 440).

The client then receives and exchanges additional characters in the character stream (step 445). For example, although the string "Spring" may likely identify information related to the several cities of Springfield, the user may enter additional information to confirm that Springfield is what the user has in mind and to identify the Springfield of interest to the user. Thus, the user may enter a field "I" as the next characters to express interest in Springfield, Ill. The host 130 and/or the database 140 receives and analyzes the additional characters (step 450). The host 130 and/or the database 140 generates a new set of results related to the update, which is exchanged with the client 110 (step 455). In the example using Springfield, Illinois, mapping and yellow page information related to the town of Springfield, Ill. may be exchanged.

The client 110 receives the updates (step 460) and enables the user interaction based on the updates (step 465). For example, a list of maps, services, and other information related to Springfield, Ill. may be displayed.

Figure 5:
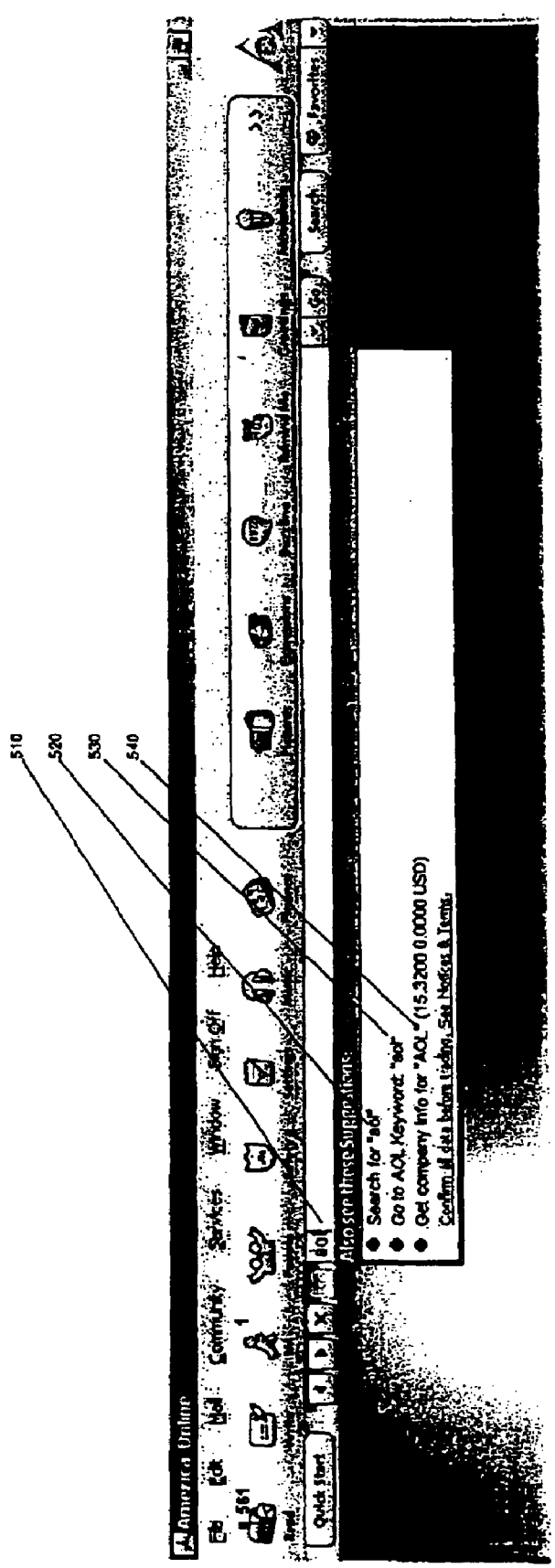
FIGS. 5-10 are exemplary graphical user interfaces (GUIs) illustrating how real-time results related to a character stream may be presented.

Referring to FIG. 5, exemplary results related to a character stream with noncompletion characters are shown in GUI 500. Generally, GUI 500 may be displayed on a client 110 that was primarily described with respect to FIG. 1 using the operations described with respect to FIGS. 2-4. GUI 500 illustrates code segments that may be invoked in a results page as a character stream is entered in a user application such as a web browser. Specifically, text entry field 510 has received the character stream "aol" without a carriage return as is indicated by the cursor "I". GUI 500 includes a result 520 that enables a search to be launched for the string "aol", a result 530 that enables a code segment to be launched for the AOL Keyword "aol", and a result 540 that enables a code segment that retrieves a stock quote for "AOL", which is shown trading at 15.32 US Dollars on a stock market exchange.

Figure 6:
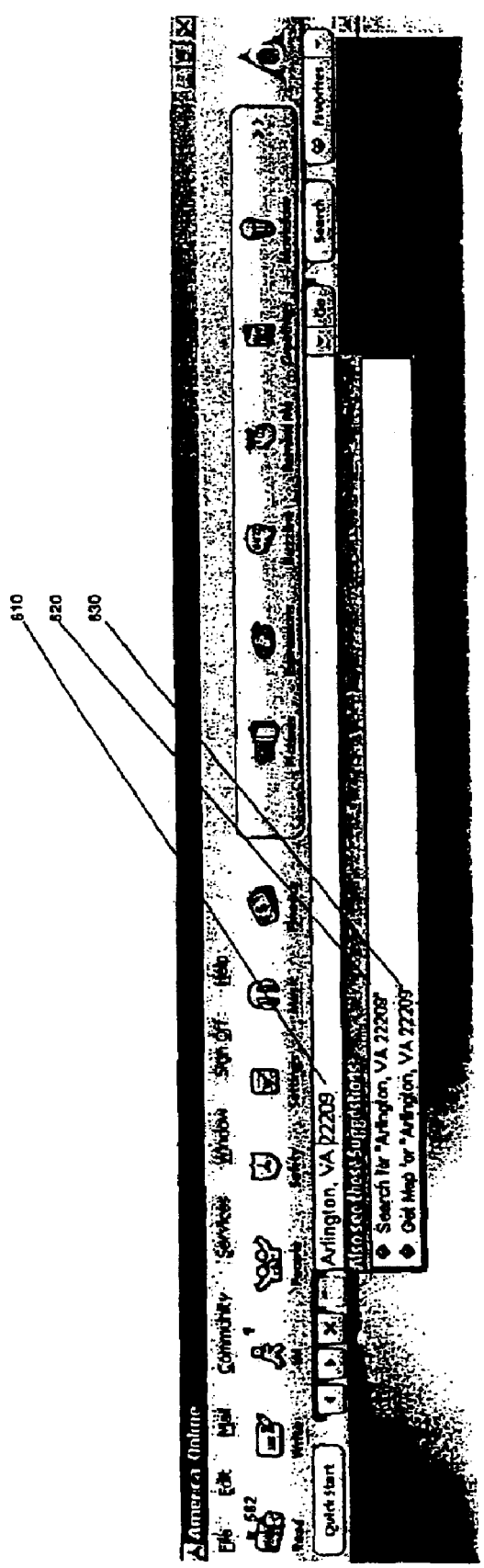

Referring to FIG. 6, exemplary results for the character stream "Arlington, Va. 22209" are shown in GUI 600. Generally, GUI 600 relates to systems, operations, and displays described previously with respect to FIGS. 1-5. However, GUI 600 illustrates the different databases and/or applications that may be accessed from a user application. For example, when "Arlington, Va. 22209" is inserted in text entry field 610, a searching code segment can be launched using result 620 and a mapping code segment can be launched using a result 630.

In one example, the displays related to results 620 and 630 have already been retrieved by the client 110. Alternatively, content in the displays related to results 620 and 630 may need to be downloaded (e.g., from the host 130 and/or the databases 140).

Figure 7:
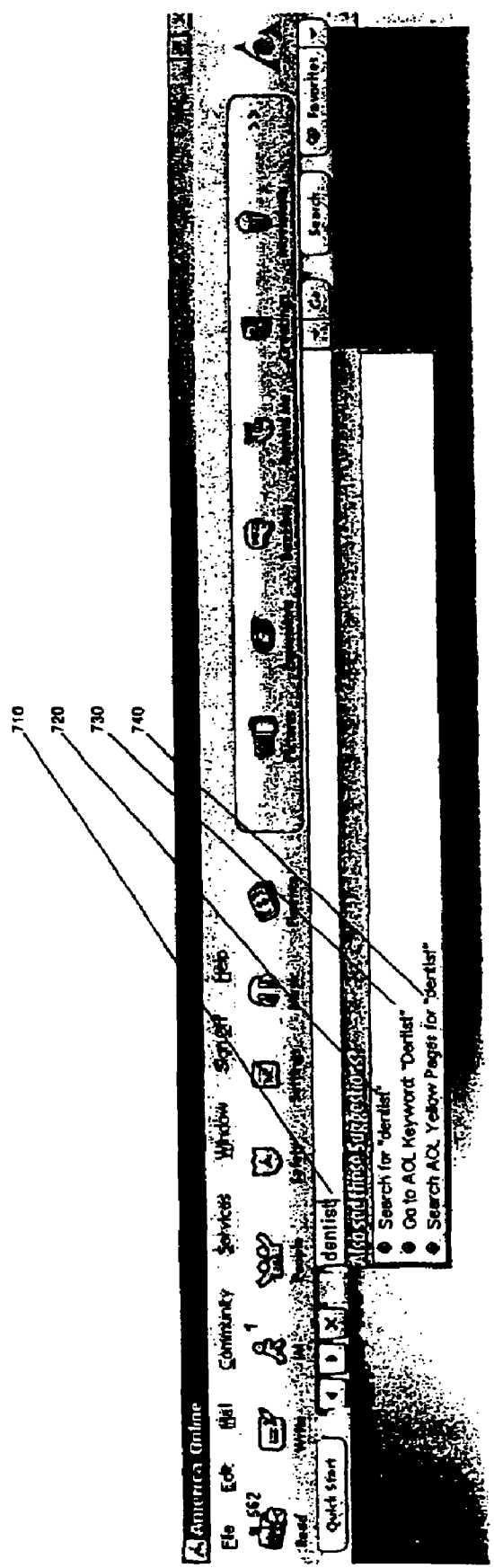

FIG. 7 illustrates a GUI 700 that is related to the character stream "dentist". Generally, GUI 700 relates to the systems, operations, and displays described previously with respect to FIGS. 1-6. However, GUI 700 illustrates how the character stream can be analyzed to identify a yellow page entry related to the character stream.

GUI 700 includes result 710 enabling the user to launch a code segment to search on the character stream "dentist". Note that, although in GUI 700 the character stream includes the complete text for dentist, shorter strings, such as "dentis" or "denti" also may be analyzed and used to generate a result that launches a search on the character strings "denti" or "dentist". Result 720 enables the user to launch a code segment so that the client can "Go to" the AOL keyword "Dentist".

Result 730 enables the user to launch a code segment to search the AOL Yellow Pages for "Dentist". Note that, although result 730 features a result to launch a search of the yellow pages for "dentist", other GUIs may include a list of available dentists. For example, if the user's location is known, a list of dentists in the user's zip code may be presented, with the dentists sorted and presented by specialties. A result from the GUI may be selected to launch the dentist's web page, launch a messaging application to exchange communications with the dentist, or launch a calendaring application to create a dentist appointment.

Figure 8:
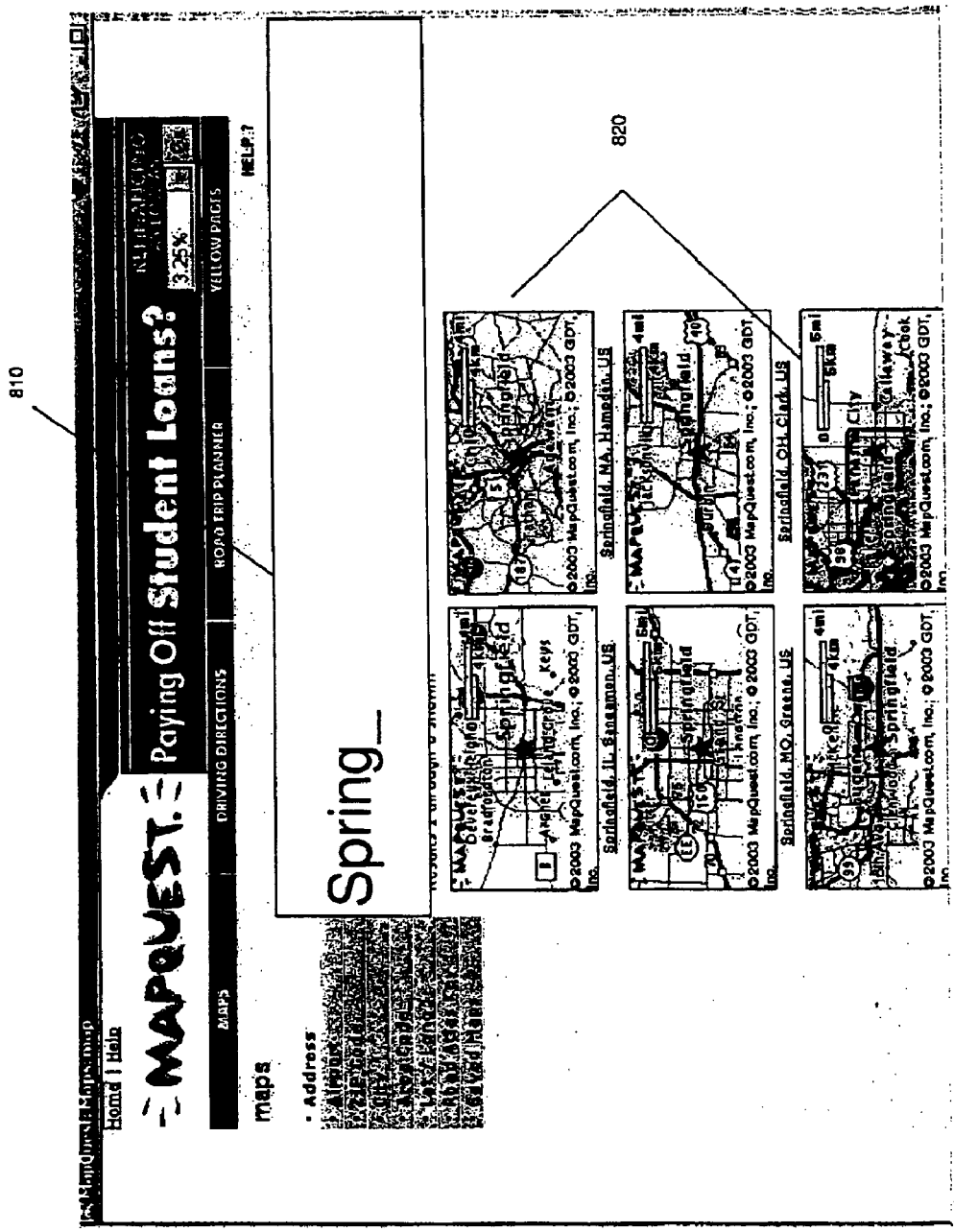
Figure 9:
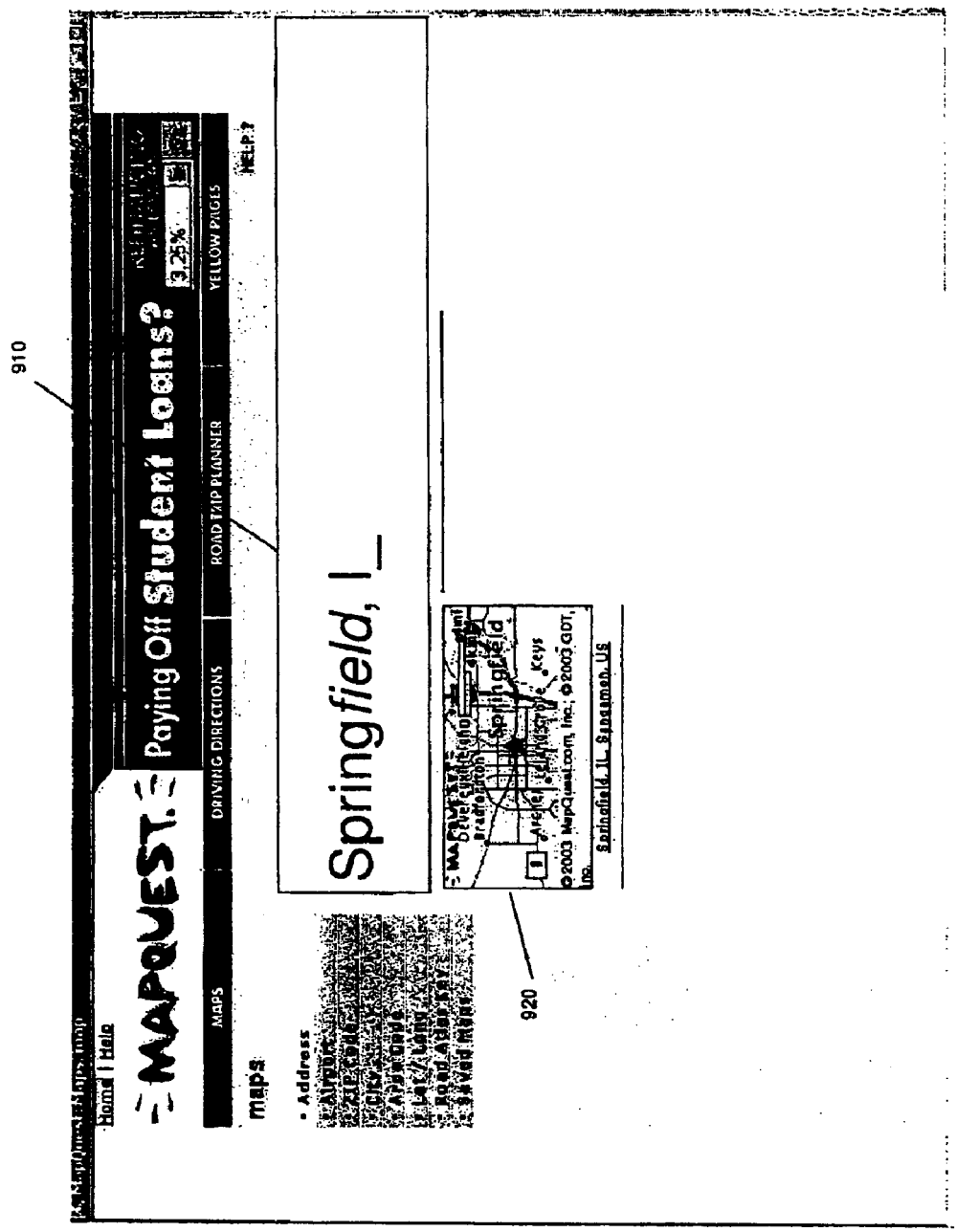

Referring to FIGS. 8 and 9, GUIs 800 and 900 illustrate how the displayed results may be altered as additional characters in the character stream are received. Generally, GUIs 800 and 900 relate to the systems, operations, and displays described previously with respect to FIGS. 1-7. However, GUIs 800 and 900 differ from the previous displays in that the results are not displayed in a drop down window as appeared in FIGS. 5-7. Also, GUIs 800 and 800 illustrate how results may be generated and displayed using a portion of the intended character stream and also how updates to the character stream need not follow the preceding character stream to precisely form the string of interest. GUI 800 shows the multiple results 820 that are available after "Spring" has been inputted into the text entry field 810. GUI 900 indicates that after an "I" is subsequently entered in text entry field 910, the results may be filtered so that only the results 920 "Springfield, Ill." are displayed. Note that none of the intervening characters (e.g., the "field," in Springfield Ill.) were included in the character stream.

Although GUIs 800 and 900 indicate that a mapping resource is being accessed, the operations described for FIGS. 8 and 9 are applicable in other applications and environments. Because the user entered the character stream within a mapping application, the results may be tailored to seek map results. This may be performed by searching a mapping database, or by polling a host 130 with a modifier indicating that mapping results should be retrieved. Although GUIs 800 and 900 do not require or allow the user to specify a mapping requirement or restriction, other GUIs may allow the user to specify the databases that are used to analyze the character stream (not shown).

Figure 10:
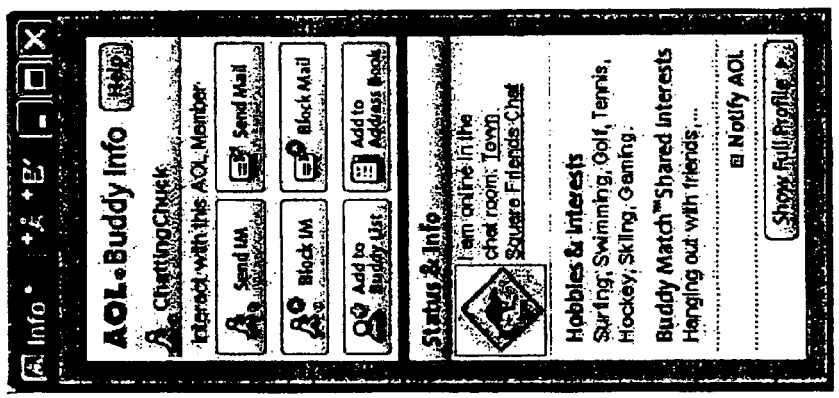

Referring to FIG. 10, GUI 1000 is an exemplary messaging display that enables a user to exchange messaging communications. Generally, GUI 1000 relates to the systems and profiles described previously with respect to FIGS. 1-9. However, GUI 1000 illustrates the messaging results that can be displayed when the character stream relates to messaging information. For example, when a user types in "chattingchuck" in a text entry field (not shown), GUI 1000 may be displayed, enabling the user to send mail, send an instant message, add "chattingchuck" to an address book, block mail and instant messages from "chattingchuck", and/or view the status or interests for "chattingchuck". Although FIG. 10 illustrates the messaging applications or operations related to one user named "chattingchuck", results related to more than one user may be displayed. Similarly, when the user enters an "@" character (the AT character associated with Internet Mail systems), options not related to electronic mail messaging may be removed.

Other implementations are in the scope of the following claims. For example, although the operations described examples of retrieving results that relate to an input stream, the results need not include the information that will ultimately be displayed upon launching a code segment. Rather, the results may include a label that describes the results that may be subsequently retrieved if accepted.

Similarly, the client and host applications may include assistants and spelling correction agents to increase the efficacy of retrieved results. Assistants may help the user by retrieving similar results related to the predicted input stream's meaning. For example, if the input stream matches the phrase "German automobiles," results that include prominent manufacturers of German automobiles, including Mercedes, BMW, and Audi, may be retrieved. Spelling correction agents or an auto-correcting input method may recognize that the user has likely entered a typographical mistake. In response, the system may correct the input and/or retrieve results related to the predicted entry.

Similar to the spelling correction agent, the system may include a validation agent that may be used to validate the input stream. For example, when the user enters information related to an object such as the address for a web site, the object may be analyzed to determine if the object is available. When analysis of the inputted stream indicates that an associated object is unavailable (e.g., improperly entered corrupt, offline, or deleted), the system may revise the inputted stream and attempt to correct the problem.

The client 110 may be used to intelligently present results related to media communications such as streaming audio and video communications. For example, a content provider or a service provider may be distributing a large number of "channels" or bands of discrete presentations. A user may wish to survey the channels to find channels presenting information most relevant to the user's interests. Accordingly, the user may enter an input stream relating to content the user finds of interest. For audio content, the input stream may relate to an artist, album, or selection (e.g., song) name. For video content, the input stream may relate to a particular news affiliation (e.g., TIME or CNN), show, episode, or subject matter. In any event, regardless of the underlying content, the input stream may be used to retrieve results related to the user's interests as expressed in the input stream. This may be performed by comparing the entered stream with metadata or subtitles associated with a particular media selection. In one instance, the input stream may be compared with the subtitles for available programming to identify results for the user. Thus, when the user enters the name of a newsmaker, the subtitles of all available programming (including on-demand and broadcast streams) may be searched to identify media streams featuring the newsmaker.

The resultant media streams may be presented in a variety of formats. In one example, a drop down menu appears to enable the user to launch a media application related to the retrieved results. In another example, when the media streams include video streams, a tile of video streams similar to the tiled orientation in FIG. 8 may be displayed. The video stream tiles may include reduced bit rate presentations to provide the user with a brief indication of the video content available. When a user selects one of the video tiles, an instance of the video selection at a greater bit rate may be presented.

The systems and operations may be modified to operate in an Intranet or trusted environment. For example, rather than searching public databases, the system may be configured to incorporate security procedures and practices associated with a trusted environment. Thus, a sales employee may be allowed to access customer and marketing databases in analyzing the input stream. Engineering personnel may be allowed to review technical and operational support databases to support their mission, but may be precluded from analyzing the input stream using a sales database. Management and/or investigatory personnel may be allowed to access most or all databases in analyzing an input stream.

The results may be stored on the client 110 and/or the host 130. For example, the host 130 may cache previously returned results that may be used when analyzing subsequent input streams. In another example, previously selected results may be stored on the client and subsequent input streams may initially be accessed using the previously-stored results.

The client 110 may enable the user application to launch a messaging code segment. Alternatively, the user may be entering the input stream in a messaging application. For example, the user may be entering an input stream in an instant messaging application. The instant messaging application may transmit the input stream to a host 130 for analysis. The client 110 may receive the results and enable the client to transmit an instant message when the results indicate that an identified user is online.

Exchanging the updates may include exchanging only the portion of the input stream that has changed since the input stream was last exchanged. For example, as a user initially types in information into a first application, the first application may send a message to the host 130 with the initially entered input stream (e.g., "Spring"). As the user enters updates to the input stream (e.g., by typing "field" after "Spring"), the client 110 may send the new information without sending the old information (e.g., the client 110 subsequently sends "field" instead of "Springfield"). Alternatively, the client 110 may send the current input stream. For example, the client 110 may first send "Spring" and then later transmit "Springfield".

The client 110 and/or host 130 may determine that there are no relevant results and operate to preclude additional processing resources from being used. For example, the user may input a sequence for which the host 130 has no information and generates no results. When the host 130 determines that there is no information, the host 130 may interface with the client 110 to prevent additional updates from being exchanged. Such a condition occurs when the user enters a sequence that does not relate to content accessible by the host 130. For example, the host 130 may determine that INPUTSTREAM1 will not yield any results, and no extension of INPUTSTREAM1 will yield any results. If the user enters additional information, such as INPUTSTREAM123, the first application will not send any updated information to the host 130. However, if the user uses the DELETE key to modify the input stream so that INPUTSTREAM1 is changed to INPUTSTREAM, the input stream may be exchanged.

The client 110 may perform preliminary analysis to preclude common input streams from being analyzed where the common input stream generates results that are not responsive to the predicted interest of a user. For example, when "the" appears in an input stream, particularly in an initial portion of the input stream, generating results using the input stream "the" likely generates too many results, few, if any, of which are responsive to the predicted interest of the user. Accordingly, exchanging the input stream may be delayed until the input stream is meaningful. Thus, exchanging the input stream "the" may be delayed until input stream reads "the Greek islands" or another input stream likely to generate meaningful results. Similarly, the input stream may be restructured to remove strings in the input stream not likely to assist in the analysis (either on the client 110 or the host 130). Thus, common strings appearing in the input stream such as "the", "a", and "this" may be removed from the input stream.

Displaying the results may include displaying the results directly in addition to displaying a label for the results that enables a code segment for the results to be launched. For example, the results may include an actual stock quote rather than a label for a code segment that generates a stock quote. The displayed result may include a capsule or brief summary for a news item. The capsule also may be configured to retrieve a more detailed article on the news item when the user selects the news item.

Although many of the operations were described with respect to a character stream received on a personal computer, the operations also may be performed in response to receiving one or more inputs from a device with a limited display and/or a reduced-size keypad (e.g., a wireless Internet tablet or telephone). For example, FIG. 1 illustrates a mobile device 1100 that may be configured to return results related to an ambiguous input. In particular, mobile device 1100 is configured to enable a user to select a sequence of one or more ambiguous inputs on a reduced-size keypad. The mobile device 1100 exchanges the sequence of ambiguous inputs with a host or disambiguating subsystem and presents results responsive to a predicted interest. To enable better perception of details, mobile device display 1110 has been projected to offer a larger rendering.

Mobile device display 1110 includes an input display 1120 and a results display 1130. Input display 1120 enables user perception of ambiguous inputs that have been entered and results display 1130 enables user perception of results responsive to a predicted interest of the user. As shown, input display 1120 indicates that ambiguous inputs "733" have been entered where "7" and "3" represent ambiguous inputs appearing in a keypad on a mobile device 1100. The characters "7" and "3" are ambiguous in the sense that the number "7" also may represent the letters "P", "Q", "R", or "S" in addition to representing the number "7", and the number "3" may also represent the letters "D", "E", or "F" in addition to representing the number "3". For an auto-correcting QWERTY keyboard system, the character "s" may also represent the adjacent letters "a", "w", "e", "d", "x" and/or "z". For a handwriting recognition system, the character "c" also may represent similarly-drawn letters "a", "e", "o", and/or "d".

The results display 1130 renders results related to the ambiguous inputs. In particular, the mobile device 1100 may provide a sequence of one or more ambiguous inputs to a host (not shown). In turn, the host may analyze the sequence of ambiguous inputs, identify results responsive to a predicted interest of the user, and return the results to the mobile device. Using the results, the mobile device 1100 is configured to render the results in the results display 1130.

As shown, a host has determined that a user entering "733" may be searching for information related to the term "Red", such as the Washington Redskins. For example, a host may determine that the character "7" represents "R", character "3" represents "E", and character "3" represents "D."

Results 1140-1144 represent one or more applications that may be launched in response to user selection of one or more of the results. In response to the host determining that the user entering "733" is likely interested in terms that include and/or begin with "RE" or "RED", the mobile device 1100 displays results 1140-1144 in results display 1130. The first result 1140 shows the score of a Washington Redskins football game and includes a link to retrieve additional information about the Redskins game. The second result 1141 includes results from a directory service application and includes a telephone listing for a Red Lobster. A user may select the second result 1140 to call the listed telephone number. The third result 1142 includes movie information for the movie "Red Dragon." The third result 1142 may be selected to purchase of tickets or provide movie listings in response to selection by a user. The fourth result 1143 includes a activation code segment structured and arranged to enable a user to purchase a DVD of the movie "The Ref." The fifth result 1144 includes a link that may be selected in order to retrieve and present a map of Redondo Beach, Calif.

The mobile device display 1110 also includes a scroll bar 1150. The scroll bar 1150 may be used to indicate and access more results than may be rendered in the results display 1130.

In one implementation, mobile device 1100 renders results 1140-1144 in response to determining that the results 1140-1144 are the most popular results for the sequence "733". Alternatively or in addition, results may be responsive to a particular user (e.g., a host has determined that a particular user is a Redskins fan). In yet another variation, the mobile device 1100 renders results responsive to a location for a mobile device. More precisely, an input sequence includes location information for the mobile device 1100. For example, a host may receive location information for the mobile device 1100 (e.g., proximity to a restaurant district that includes a Red Lobster Restaurant) and return results for proximate restaurants related to the input sequence.

As shown, input display 1130 includes a cursor 1132. Cursor 1132 illustrates that additional inputs may be exchanged to further disambiguate results.

Figure 11:
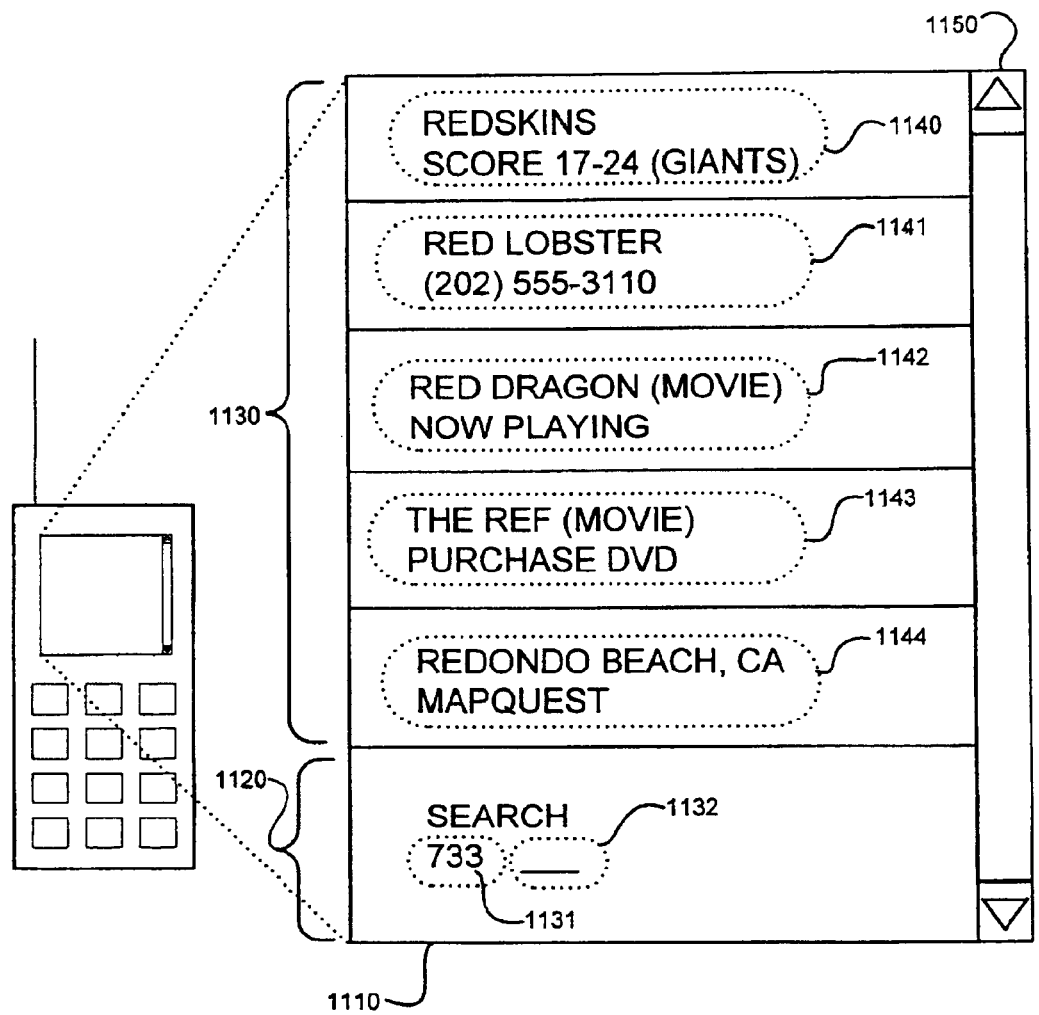
FIG. 11 illustrates a mobile device that may be configured to return results related to an ambiguous character.
Figure 12:
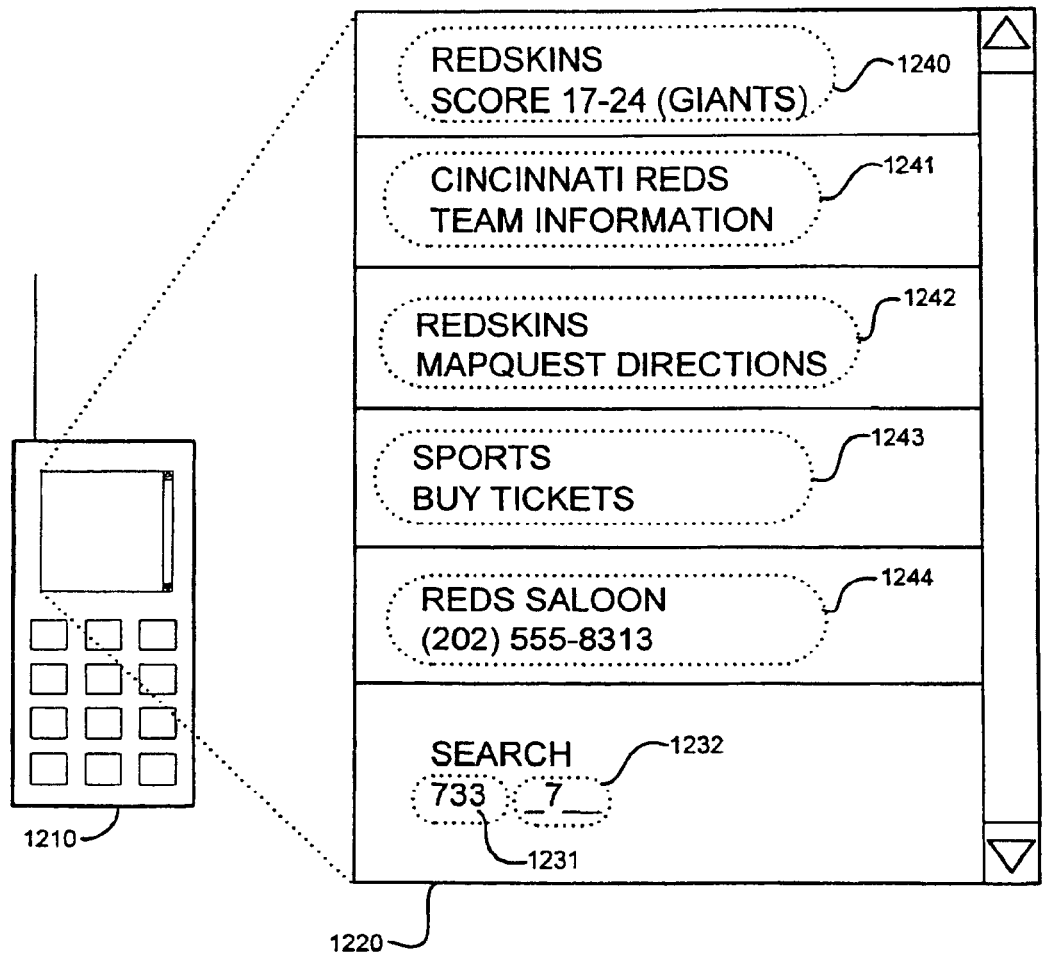
FIG. 12 illustrates a mobile device configured to return results responsive to additional input of ambiguous characters after initially presenting results responsive to ambiguous characters.

For example, FIG. 12 illustrates a mobile device 1200 configured to return results responsive to additional input after initially presenting results. Generally, the mobile device 1200 relates to the mobile device 1100 described with respect to FIG. 11. However, the mobile device 1200 illustrates how results appearing in results display 1230 may be modified in response to receiving an additional input. A host may use the additional input to more precisely tailor results.

As shown in input portion 1220, the mobile device 1200 indicates that a "7" has been entered in addition to the "733" shown in FIG. 11. As a result, the input sequence 1231 is "7337". Using "7337" as a sequence of ambiguous characters, the mobile device 1200 renders results 1240-1244 in results display 1230.

While the first result 1240 in FIG. 12 is similar to the first result 1140 in FIG. 11 (updated with a current score), other results may differ from results 1140-1144 shown in FIG. 11 to reflect the addition of another input. For example, the results display 1230 no longer includes results that include the completed word "Red" such as "Red Lobster" or "Red Dragon", in contrast to results that merely include "red" as a sequence of characters (e.g., Redskins). Reflecting the addition of "7" to the input sequence, the second result 1241 includes a link to information about the Cincinnati Reds. Note that on some keypads, a "7" key also may represent the characters "P", "Q", "R", and "S" in addition to the number 7. Thus, "7337" may represent the "REDS". Also, the second result 1241 illustrates that a result need not be limited to results that begin with the input sequence. For example, the second result 1241 relates to an entry that begins with "Cincinnati."

The third result 1242 includes an application that may be selected to receive driving directions to a Washington Redskins venue. The fourth result 1243 includes a program that may be selected to buy tickets for sporting events. The fifth result 1243 includes results from a directory service application and includes a telephone listing for a "Reds Saloon."

Although FIGS. 11 and 12 illustrate actual results being rendered, a stem appearing in the results also may be rendered. The stem may represent a portion of a term or result. To the extent that a stem is appears in multiple results, selecting a stem may be used to render multiple results and/or additional stems appearing after or based upon a present stem.

While FIGS. 11 and 12 illustrate that an input sequence may be resolved without specifying a structure for a term (e.g., length), a user may use a special character such as a "space" character to resolve an ambiguous input stream. FIG.

13 illustrates a mobile device 1300 configured to return results responsive to the input of a space character after initially presenting results responsive to an input sequence. The input of an end-of-word character may be used to delineate term boundaries in an input sequence, such as indicating whether a user is interested in results that are related to the completed word "red" rather than words that merely include the word "red" (e.g., the Washington Redskins). The results display 1330 may be modified to show only Red Eagle related results. The results display 1330 differs from the results display 1130 of FIG. 11 in that all of the results 1341-1345 are Red Eagle related results, whereas results display 1130 only includes one Redskins-related result. The results display 1330 includes a header 1340 represented by the "Red Eagle" title to aid user perception that all results are Red Eagle-related. Although a space may be used to indicate a degree of acceptance of the results rendered, other results also supported by the input sequence with the space also may be rendered. For example, results related to "SEE" also may be returned where "733" has been entered.

A user may use a "next word" key to advance through different stems. For example, although "RED" may represent a likely word step, a user may use a soft key to advance through other stems. In the case of "733", the stems may include "REF", and "SEE". As a result of the user advancing through different stems, the stem to which a user advanced may be determined to be a stem most likely responsive to a user's predicted interest, and thus, rendered before other stems.

The first result 1341 in the results display 1330 is similar to the first result 1140 of a sporting event referenced in FIG. 11. The "Red Eagle" may be filtered out or reduced as a result of the header 1340 rendering "Red Eagle." The second result 1342 includes an application that may be selected to purchase tickets to a Red Eagle game. The third result 1343 includes a application that may be selected show the latest headlines and news information about the Red Eagles. The fourth result 1344 includes an application that may be selected to receive driving directions to Red Eagle Field. The fifth result 1345 includes an application that may be selected to receive information about weather conditions at Red Eagle Field.

Inputs other than a space character may be used to resolve an input sequence. In one implementation, an input sequence may be resolved by, for instance, inputting a non-alphanumeric character such as "-" or "@" from a page of symbols, or by pressing an arrow button on a mobile device.

Figure 13:
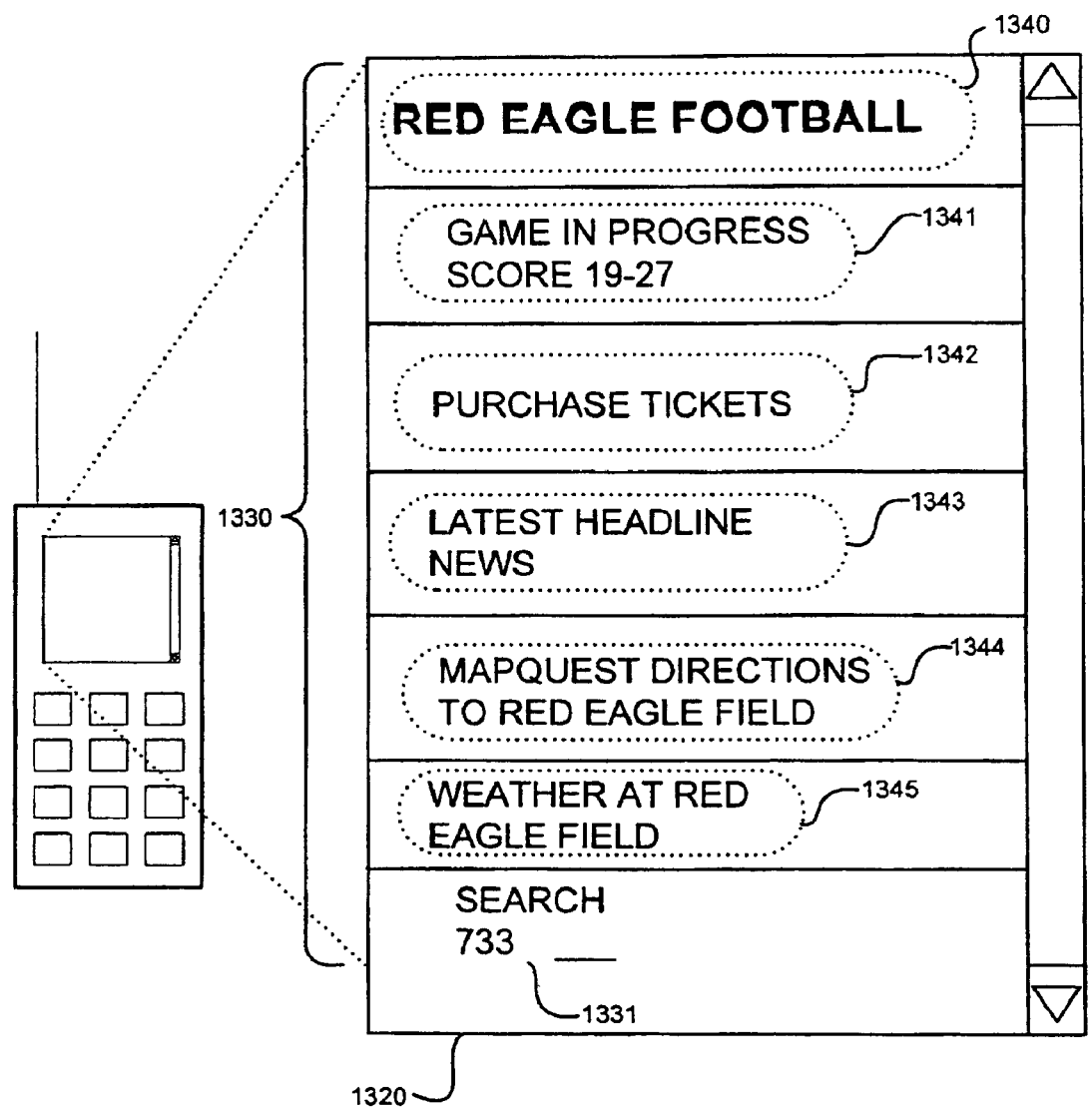
FIG. 13 illustrates a mobile device configured to return results responsive to the input of a space character after initially presenting results responsive to a sequence of ambiguous characters.

The results in result displays 1130, 1230, and 1330 maybe selected by a user. When a user selects a result, the mobile device is typically configured to perform a particular action responsive to the result selected. For example, in order to obtain more information about a Red Eagle football game, a user may select result 1341 in FIG. 13.

Figure 14:
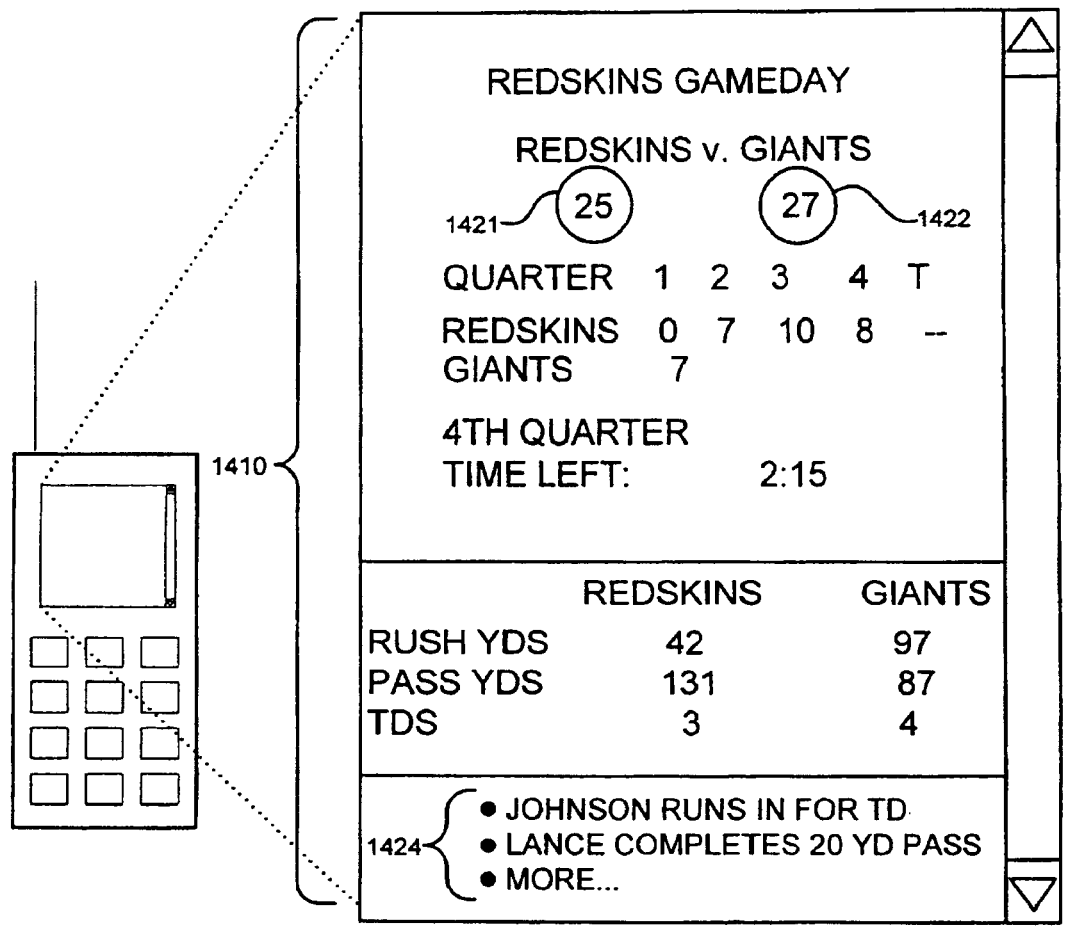
FIG. 14 illustrates a mobile device configured to display information related to a result that has been selected.

Exemplifying a display that may be displayed responsive to selecting a result, FIG. 14 illustrates a mobile device 1400 configured to display information about a football game in progress. The game information includes the Redskins score 1421, the Giants score 1422, a variety of game statistics 1423, and a play-by-play information section 1424.

Figure 15:
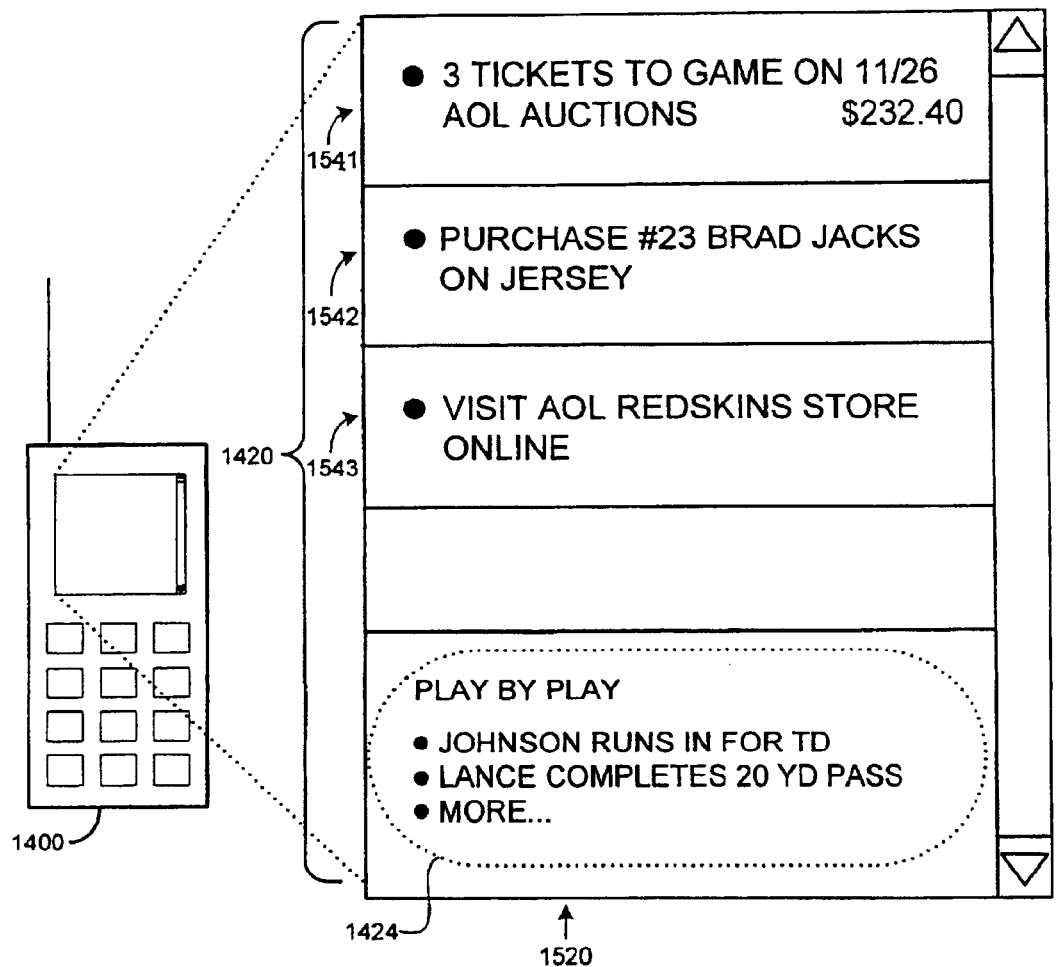
FIG. 15 illustrates a mobile device configured to display advertisements associated with user inputs.

FIG. 15 illustrates a mobile device 1500 configured to display advertisements associated with user inputs. The advertisements 1541-1543 shown in the mobile device display 1510 correspond to products and services that are related to the Washington Redskins. The first advertisement 1541 represents a classified advertisement and offers three Redskins tickets for sale. The second advertisement 1542 offers a Redskins jersey for sale. The third advertisement 1542 is an advertisement to visit an online store that sells Redskins paraphernalia.

In one implementation, mobile device 1500 renders advertisements 1541-1543 in response to the user selecting a result. Alternatively, or in addition, advertisements may be responsive to an input sequence. For example, prior to narrowing a search to return only Redskins results, advertisements may have been displayed offering Red Lobster discounts. The advertisements also may be responsive to a particular user, for example, where the shopping habits of the particular user are known.

Figure 16:
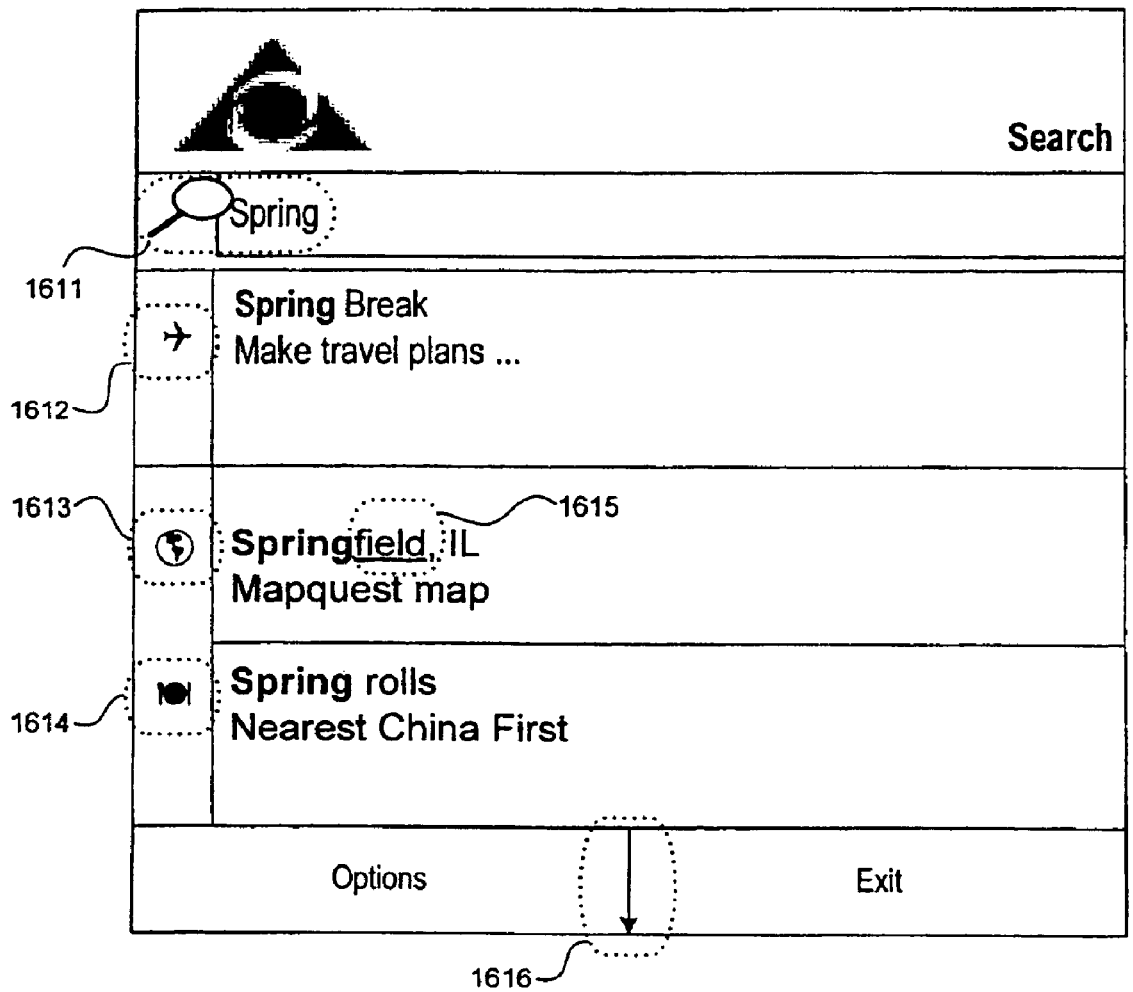
FIG. 16 illustrates a mobile device display for a mobile device that is configured to return results related to one or more ambiguous characters.

FIG. 16 illustrates a mobile device display 1600 for a mobile device that is configured to return results related to an input sequence. Results 1611 renders an input sequence. The results 1611 display the text "Spring", representing one result responsive to the input sequence "777464". In one implementation, the results rendered in the results 1611 relate to one or more results. In another implementation, the results 1611 are responsive to a user preference and/or profile. For example, as shown FIG. 16, the mobile device may render "Spring" where a user inputs the sequence "777464" when the user's location is determined to be proximate to Springfield, Ill.

FIG. 16 also illustrates the use of icons to provide an indicate of an application invoked in response to selecting a particular result. Icons 1612-14 are displayed in association with each result. Icon 1612 displays an airplane icon in association with a first result to indicate that selecting the first result launches an application for planning and arranging travel. Icon 1613 displays a globe in association with a second result to indicate that selecting the second result launches a mapping application. Icon 1614 displays a table icon in association with a third result to indicate that selecting the third result launches an restaurant application. Although the operations were described with respect to an application that is launched, the result also may relate to an object such as content (e.g., a ring tone or an audio clip).

The mobile device display 1600 includes a special symbol 1616 (e.g., a downward arrow symbol) that corresponds to a button on the mobile device. Using a button related to a special symbol, a user may advance through the results and view additional results beyond those rendered on the mobile device display 1600. Also, the mobile device display 1600 may include one more "shortcuts" for a user to select a particular result. As shown, the substring "field" from the string "Springfield" is underlined in the second result displayed on the mobile device display 1600. The underlined text indicates that a user may select the second result by inputting the character "f" or an ambiguous input that corresponds to "f" such as the number "3."

Figure 17:
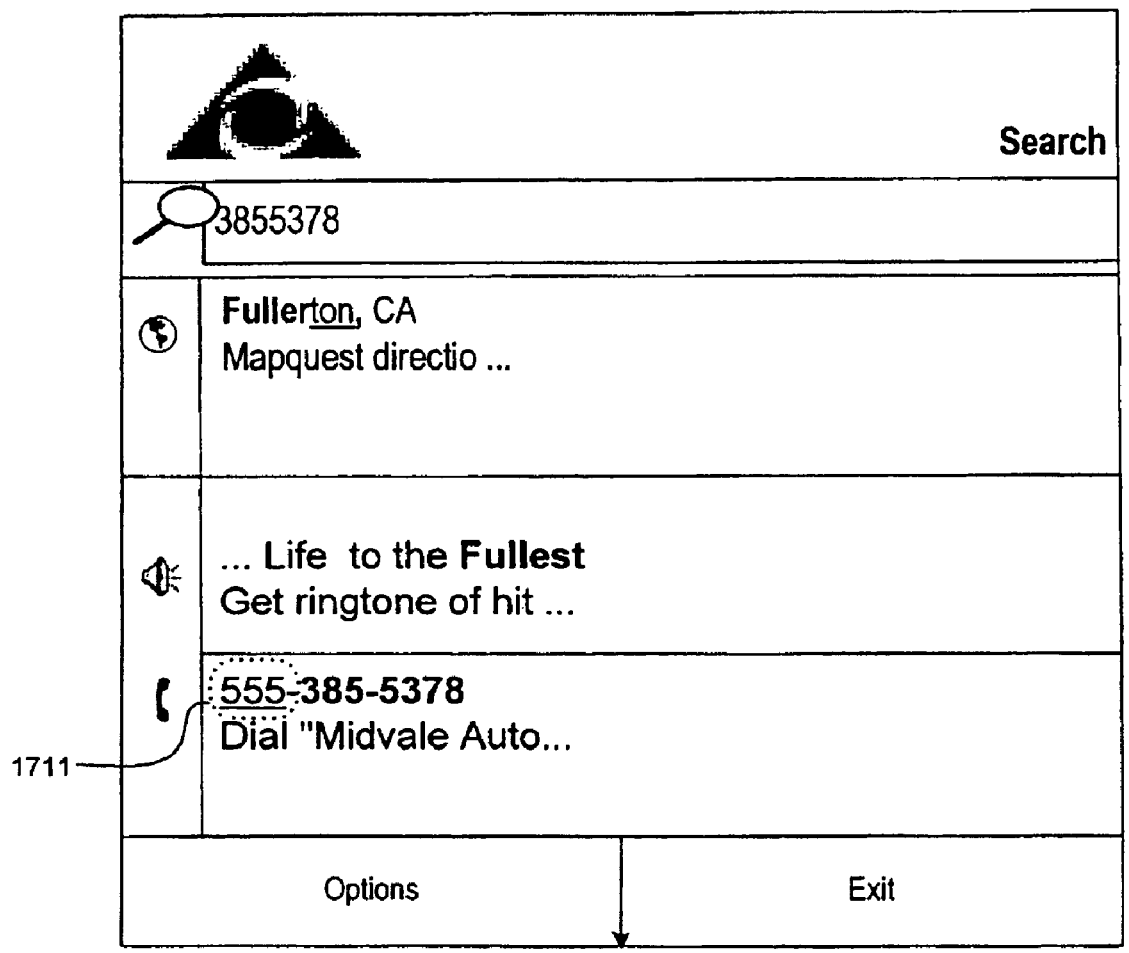
FIG. 17 illustrates how a "shortcut" may relate to characters appearing at the beginning of a disambiguated term.

FIG. 17 illustrates how the results may change after each input to narrow results. For example, "Fullerton, Calif." becomes more likely, moving from second to first position, while "Dulles" is eliminated from consideration, when the "8TUV" key is added to the input sequence. The third result in the second display currently labeled 1711 illustrates that the input sequence "3855378" may retrieve reasonable results even though in this case the sequence did not also match the area code preceding the phone number.

In FIG. 16, the underlined portion of text relates to subsequent characters that have not yet been entered. FIG. 17 also illustrates how analysis may return results related to characters that have not been entered that appear at the beginning of a disambiguated term. In another implementation (not shown), a result with the underlined characters may be selected to use the selected result as a term. In yet another implementation, the underline characters represent a "shortcut" to keys that may be selected. Other substrings related to other results may be underlined to indicate a shortcut to other results. For example, when the underlined text represents a selectable shortcut, the third result illustrates that after 555-(1711) has been entered, a "5" may be entered to select an application related to phone number "555-385-5378".

In one implementation, a selection shortcut is indicated as a digit next to each result (not shown). The user may press a key to indicate entry is complete and enter a selection mode, and then press the key corresponding to the digit next to the desired result. On another device, the user may be required to hold down the corresponding key for a period of time (e.g., 1 second or longer) rather than entering a separate selection mode. On a touch-screen device a user may tap directly on the desired result to invoke the default action or display a menu of choices.

Special input keys, such as a soft key, may be used to rapidly navigate results. For example, a first special character may be used to only display contact information used to file out (e.g., pressing "#" only returns results from an address book or a directory service application) while a second special character may be used to filter out other results (e.g., pressing "*" removes results related to an address book application or a directory service application). Alternatively or in addition, entering a special character may be used to automatically select a result (e.g., pressing left arrow selects a mapping application).

Additional shortcuts may be available to rapidly navigate results such as a dedicated key, a mode-specific key, or a menu option configured to reduce the number and type of results. For example, selecting the "Options" menu item labeled "Show Contacts" while the results are displayed may filter out any items not offering contact information. Alternatively, the results of a search may be passed to an application the user invokes; for example, if the user presses a dedicated "Web" key, a browser may be launched that has related web addresses ready for selection.

Figure 18:
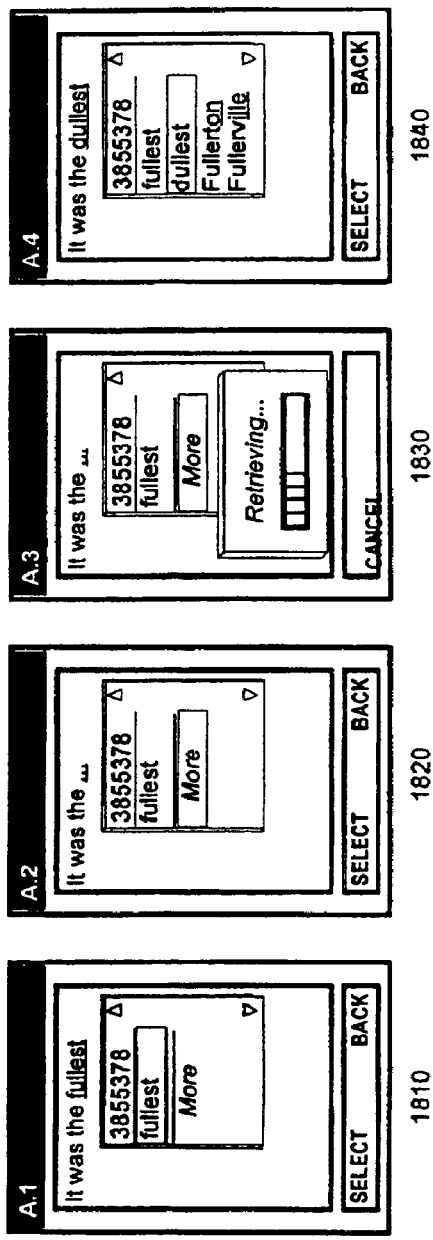
FIG. 18 includes four exemplary mobile device displays illustrating how a sequence of ambiguous characters may be entered and analyzed to generate a term as a result for inclusion in a text message.

FIG. 18 includes four exemplary mobile device displays illustrating how an input sequence may be entered and analyzed to generate a term as a result for inclusion in a text message. First mobile device display 1810 indicates that "3855378" has been entered. First mobile device display 1810 also includes results. In one implementation, selecting a result may execute an application on the mobile device. In another implementation, selecting a result may include initially executing an application on a host and/or presenting data resulting from execution of the application on the host.

Mobile device display 1820 indicates that the input sequence may be resolved to "3855378" and "fullest". A "More" banner is displayed below the results. A user may select the "fullest" result from the results to insert the string "fullest" into a text message. Alternatively and as illustrated in the second mobile device display 1820, a user may select the "More" banner in order to render additional results. Subsequently, as illustrated by the "Retrieving" banner and a corresponding progress meter in the third mobile device display 1830, additional results are rendered. Mobile device display 1840 displays additional results. For example, a mobile device may use a local processing capability to present first results and retrieve additional results accessed from a host in response to a user request for additional results.

Results may be retrieved from specialized databases depending upon a manual or automatic determination of the information needing disambiguation. For example, if the user is a medical specialist and typically uses a lot of medical terms that are not stored locally, the user may select a medical terms mode or the preliminary analysis code segment may determine that medical terms have been used in the past and that a remote medical terms database will be used to analyze the input sequence. Other specialized databases include legal terms, personal address books, or AOL keywords. Still, other databases may include common misspellings, or current words and phrases such as slang and news headlines.

Figure 19:
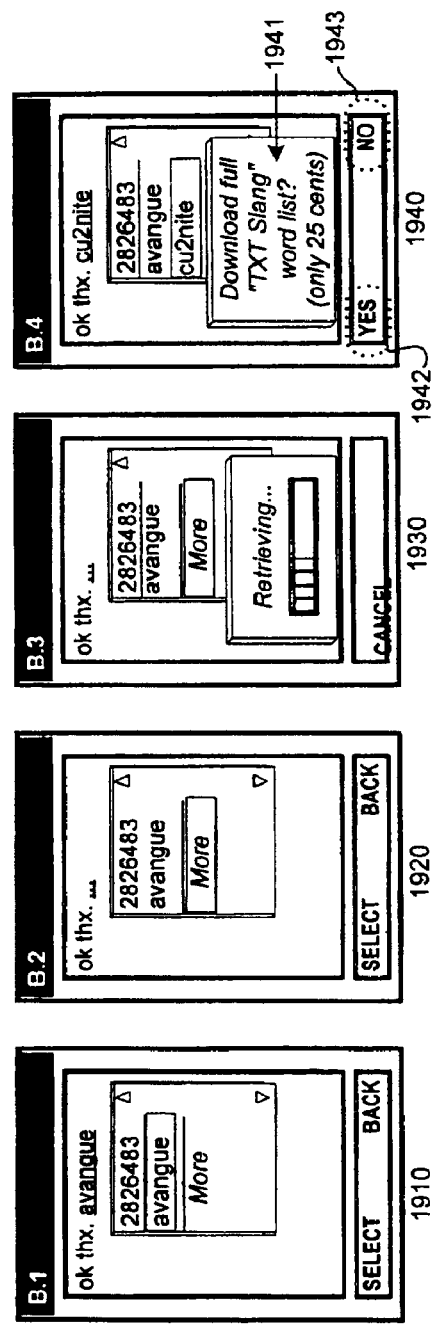
FIG. 19 includes four exemplary mobile device displays that are associated with a mobile device configured to receive one or more ambiguous characters and retrieve results responsive to the ambiguous characters.

Similar to FIG. 18, FIG. 19 includes four exemplary mobile device displays that are associated with a mobile device configured to receive an input sequence and retrieve matching results. Mobile device display 1910 indicates that "2826483" has been entered. Mobile device display 1910 includes results with the character sequences "2826483" and "avangue." A "More" banner is rendered below the results. Mobile device display 1920 and mobile device display 1930 illustrate how a display may be modified as a result of a user selecting a "More" banner with a host retrieving additional results.

Mobile device display 1940 includes additional results retrieved from a host. The results includes a "slang" term "cu2nite". Mobile device display 1940 also includes a prompt 1941 to download a "TXT Slang" dictionary for twenty-five cents. A user electing to download the dictionary may select the "yes" input 1942 while a user not electing to download the dictionary may select the "no" input 1943.

Figure 20:
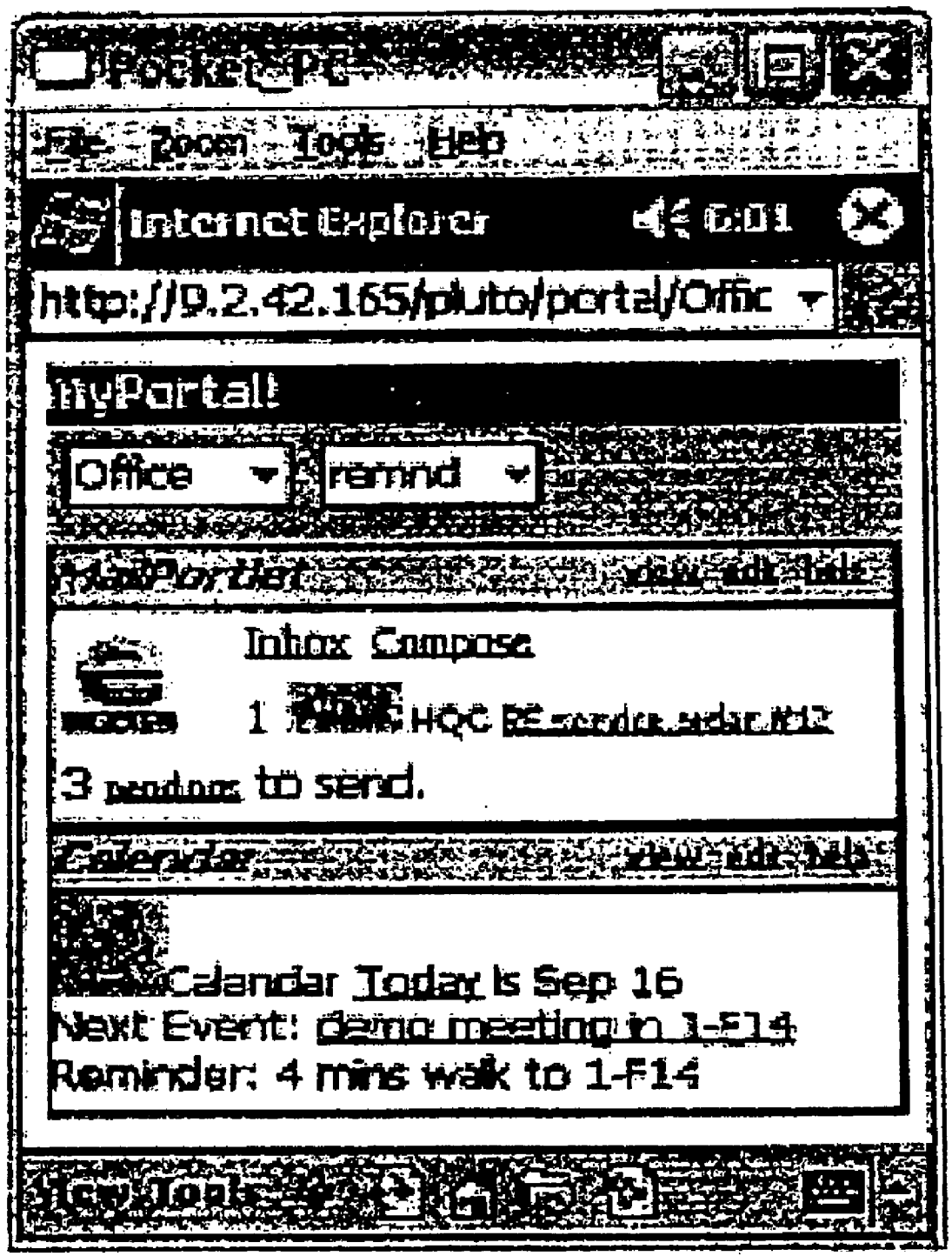
FIG. 20 illustrates a java applet that may be launched in response to selecting an application appearing as a result.

In one implementation, results may be returned to a "text only" application that has already been launched (e.g., a text message being generated). Alternatively or in addition, applications may be launched responsive to an input sequence. And, selecting a result may launch a rich array of applications, such as a multimedia application or a geolocation service. For example, FIG. 20 illustrates a java applet that may be launched in response to selecting an application appearing as a result.

Other examples of results that may be retrieved may include, but are not limited to, phone numbers and/or keywords. Clicking on a result with a phone number may allow a phone call to be placed. The phone call may be bridged to a telephone network or connected to an IP phone (e.g., a virtual phone application residing in a dialed user's PC).

The results and additional information descriptive of results previously returned or selected may be stored on the client 110 and/or the host 130. For example, the most recently accessed results may be cached on the client 110, while a more extensive history of results may be cached on the host 130. The stored results may be accessed and used to analyze and generate results responsive to a user's predictive interest.

To illustrate how stored results may be used to analyze a subsequent input stream, a previous search related to the National Football League (NFL) may generate a series of metadata tags. These metadata tags may be stored in a profile associated with the user. For example, the user searching for NFL-related information may have the metadata tags "NFL", and "Football" added to their user profile. The metadata tags may be used in performing subsequent analysis. Thus, when the user types in "Falcons", additional metadata tags related to the multiple meanings of "Falcons" may be generated and analyzed using the metadata tags previously generated. Examples of metadata tags related to Falcons may include terms such as "NFL", "Audubon Society", and "Sport of Kings". The metadata tags from the previous search on the NFL may be compared against metadata tags generated by entering "Falcons". By correlating the results from a previous search with known metadata tags for the term of interest, results that are likely to be more responsive to the predicted interest of a user are returned. In this case, correlating the results of the previous search with the present search generates results related to the NFL's Atlanta Falcons.

The results from multiple users may be used to determine results that are more responsive to a predictive interest of a different user. For example, if most of the users entering "Falcons" as an input stream are determined to be interested in the NFL, a default rule may be created and adopted that returns results related to the NFL sports team in response to "Falcons." A finer analysis may be performed by suspending the default rule when the user has a profile or has expressed an interest in other, non-sports aspects of "falcons" or used modifiers such as "birds", "Audubon Society", or "kestrels".

Although many of the operations were described with respect to an alphanumeric keypad, the operations also may be used in support of other input entry systems including ideographic, stylic entry, and handwriting recognition-oriented systems. For example, handwritten strokes or stroke categories may be mapped to the available keys so that a user may enter strokes for a desired character in a specific order. In another example, a phonetic alphabet is mapped to the keys so that a user may enter a phonetic spelling of the desired character. The user then may locate and select the desired character from among the several that may relate to the input sequence.

Analyzing an input sequence may incorporate results from prior analysis. For example, a host may determine that two or more ideographic characters are often needed to define a term, word or phrase. A host may recognize that the input sequence likely represents a portion of a phrase. In recognizing that the input sequence represents a portion of a phrase, the host may reduce the requirement to analyze and/or select subsequent characters, ideographs, or words individually.

In one implementation, local analysis is performed before the input sequence is exchanged with the host. For example, if a user enters "Dulles" and the client does not have a desired term in a client vocabulary or dictionary, the client may exchange "Dulles" with the host. In another implementation, results retrieved from a host may be selectively or automatically loaded to a local dictionary on the client. For example, the client may reserve a specified amount of storage for the most recently retrieved results and/or the most popular results.

In one implementation where handwriting recognition is being used, a client may initially resolve a user input to a character. A sequence of one or more characters then may be exchanged the host. The host may be configured to perform analysis on characters related to the characters that have been received so that results may be returned even where a user input was incorrectly recognized. For example, a client with a touch screen that uses handwriting recognition may incorrectly recognize a first handwritten "e" character as a "c" character. The client may exchange the "c" with a host. The host may modify the analysis in response to receiving an indication that the client is using handwriting recognition to account for entry of errors during the preliminary handwriting recognition. As a result, the host may return results responsive to the first handwritten character represented as an ambiguous character for "c" and "e".

A client may submit attributes and/or modifiers indicating so that a host may provide results more likely to be responsive to a user's predicted interest. In one implementation, the client indicates that the client is a wireless phone with a reduced-size keypad and limited display. As a result, the host may be configured to provide results tailored to the limited display and/or related to mobile use. In one example, a host may provide results related to the application most commonly accessed by mobile users (e.g., directory services and mapping applications. In another example, a host configured to include mapping content in results may be configured to "favor" results proximate to a user's location.

Results may be retrieved from multiple databases, including databases from different languages. A host may detect that a term from a different language has been selected, and, as a result, return results responsive to the different language that has been detected. For example, a host may offer German matches related to an input sequence. In response to detecting that a user has selected a German term, the host may be configured to perform relate subsequent input to German terms, such as German automobile manufacturers.

A content provider may establish a "preferred" area of content from which results should be initially returned. For example, a wireless carrier may enable access to content on specialized hosts configured to serve content to wireless phones. The specialized hosts may selectively enable access to content based on a status of a subscription and/or reconfigure content hosted elsewhere for better display on a wireless phone.

The client may include nonvisual input and display systems. In one implementation, a wireless phone may include a text-to-speech engine that generates an audio signal related to each result. In another implementation, the wireless phone may include a wireless phone that uses voice inputs to rapidly navigate among results that have been returned. For example, a voice recognition engine on a wireless phone may experience difficulty in resolving a large vocabulary and/or a particular dialect. A user may rely upon a reduced entry keypad to initially enter terms that should be used. After rendering some terms in the results, the voice recognition system may be activated and used to select from among the results that have been rendered.

In one implementation, the client selectively activates a communications interface to a wireless network in response to receiving a threshold number of inputs. In another implementation, the client accesses an "always on" communications interface. In yet another implementation, the client accesses a low bandwidth communications interface to exchange the input sequence and/or low bandwidth results. If the user is accessing results that are more resource intensive, such as a sample of a ring tone, a higher bandwidth communications interface may be established.

Multiple levels of disambiguation may be performed. For example, a host may analyze an input stream and resolve the input stream to one or more terms. For example, a "24737" may be resolved to "BIRDS". The terms then may be further resolved to reflect ambiguous meaning for terms. For example, "24737" may be resolved to "Baltimore Orioles" for users determined to be baseball fans in the greater Baltimore region. In implementation, the additional disambiguation is performed after resolving "24737" directly to "BIRDS". In another implementation, "24737" may be directed resolved to "Baltimore Orioles" when a host database supports a more detailed level of user profiling and a sports vocabulary.

When entering a search query using ambiguous inputs, a user may experience difficulty finding results responsive to the user's interest where characters useful in identifying results appear in two or more separated terms. For example, a user attempting to retrieve results related to email addresses, web URLs ("Uniform Resource Locators"), phone numbers, and other data may find it more convenient to search for results by inputting portions of a first term, inputting a separator (e.g., special character such as # of *), and then entering portions of a second term. To illustrate, a user attempting to enter the email address john_smith@aol.com may find it cumbersome to enter in the entire email address as the user would enter seventeen characters. The user may instead enter the term "john", a separator, and the term "aol".

A user may similarly experience difficulty in identifying terms that include special characters in entering punctuation and special designators (e.g., periods or hyphens). A user may experiencing difficulties in entering the phone number (X23)-572-8711 where X23 is a commonly-entered or proximate area code. To reduce this burden, the user may enter X, a separator, a "5", and then "871"). As the user continues entering characters, a pool of potential results that is displayed may be updated to reflect the addition of subsequently entered characters. In yet another example, a user attempting to identify IP address 192.168.0.1 may enter "19", a separator, and then enter "68", rather then enter the enter character sequence for "192.168.0.1".

An analytic engine on a wireless device (or on a host accessible by the wireless device) may identify results based on per-attribute or per-string specification of how an attribute may be matched. Although default analytical engine may be provided, specialized analysis tools may be developed. For example, a modular analytic engine configured to operate as a "plug in" tool may designate specific keys or characters to separate strings (e.g., a white-space, period, or '@' symbol). The modular analytic engine also may specify that other characters may be ignored in a search. For example, a parenthesis, period and/or hyphen appearing in a candidate representing a phone number may be ignored. In other words, a user may enter characters associated with a phone number without inputting hyphens or parentheses often used to designate a phone number. Alternatively, the modular analytic engine may reduce the impact of designated characters in identifying results.

In one implementation, a result may be categorized with a primary or secondary designation. A primary designation may be used represent a "match" within the textual representation of the item or an associated attribute-value pair for the item. In one example, primary matches are always rendered (or favored), so that the representation for the result is always visible (or favored over other results with secondary designations).

Results categorized with a secondary designation (e.g., a secondary match) represent results that are responsive to the entered input where the entered input is not found within (or does not relate to) the textual representation of the item or the associated attribute-value pair. Secondary results may be displayed in association with primary results. For example, secondary results may be shown within parentheses. In one implementation, status as a primary or secondary result is used in determining an order in which results are displayed.

Additionally, other forms of analytics may be used such as non-character-based "skipping" or "splitting". An analytical engine may be configured for "splitting" strings to identify results that begin at a logical position within a term or a string. For example, the input sequence "spin" may be a stem that matches "ThisIsSpinalTap.wmv" due to the pattern of capitalization recognized by the analytical engine. "Skipping" may be used to identify results that include stems that are separated by characters that have not been entered. Thus, a user may enter "206555" and still match the phone number "(206)555-2121" or the ZIP+4 code "20655-5102" even though the punctuation is not input. And, although it may reduce the computational burden on an analytic engine by performing analysis with respect to the beginning of a string or field, the analytic engine also may begin analysis at characters other than the beginning.

In various implementations, users may use spacing to concurrently effect parallel analysis for responsive characters. When searching a large number of terms or terms that are very similar, concurrently searching terms may reduce required key inputs for a match. This process enables the user to initiate a multi-stem ambiguous matching by entering characters to separate stems. For example, a user may input characters into a stem by typing the '7' and '4' keys. The input may initiate a search for responsive terms to the ambiguous stem which may be displayed. In particular, the results of a phone book entry "Phil Johnson" and a menu item "phone book" are both displayed as matching terms, as '74' matches the letters 'ph.' The user may enter a space, such as the '#' key and type the '2' key to initiate an ambiguous search of a second stem. The input of # the pound key signifies a new stem is to be searched for ambiguous matching. The results, which include matching ambiguous terms for both stems, may then be displayed. The phone book entry "Phil Johnson" does not have a term matching the stem created by the '2' key, and is not matched. Thus, by searching on both the first and second stems concurrently the search has been narrowed. And, although two stems were described as being used, the operations may use a differing number of stems. For example, if a user is accessing a large database from across a communications network and trying to identify a very particular piece of information across a dense information domain where a large number of results is returned, the user may continue entering stems until the user locates the desired result. The user also may delete stems that the user identifies as being nonresponsive to a desired result. Alternatively, the user may work with a single stem and modify the single stem until the desired information is located.

When searching multiple terms, a first search of a first term may be used to generate a list of candidates with possible matching terms. Entry of characters as a second term may be used to initiate a second search using the second term further revise the identified results. Thus, each additional term (up to as many separate terms as may be necessary) may narrow the list of results that are returned.

In one implementation, a search query may be concurrently sent to several different hosts or providers, with the multiple queries coming from a client (e.g., the handset with which the search is requested) directly or aggregated on a host and sent to the client within a unified result set. The searching may be differentiated by content type (music search, place search, news search), content providers, or other factors such as client location.

Figure 21:
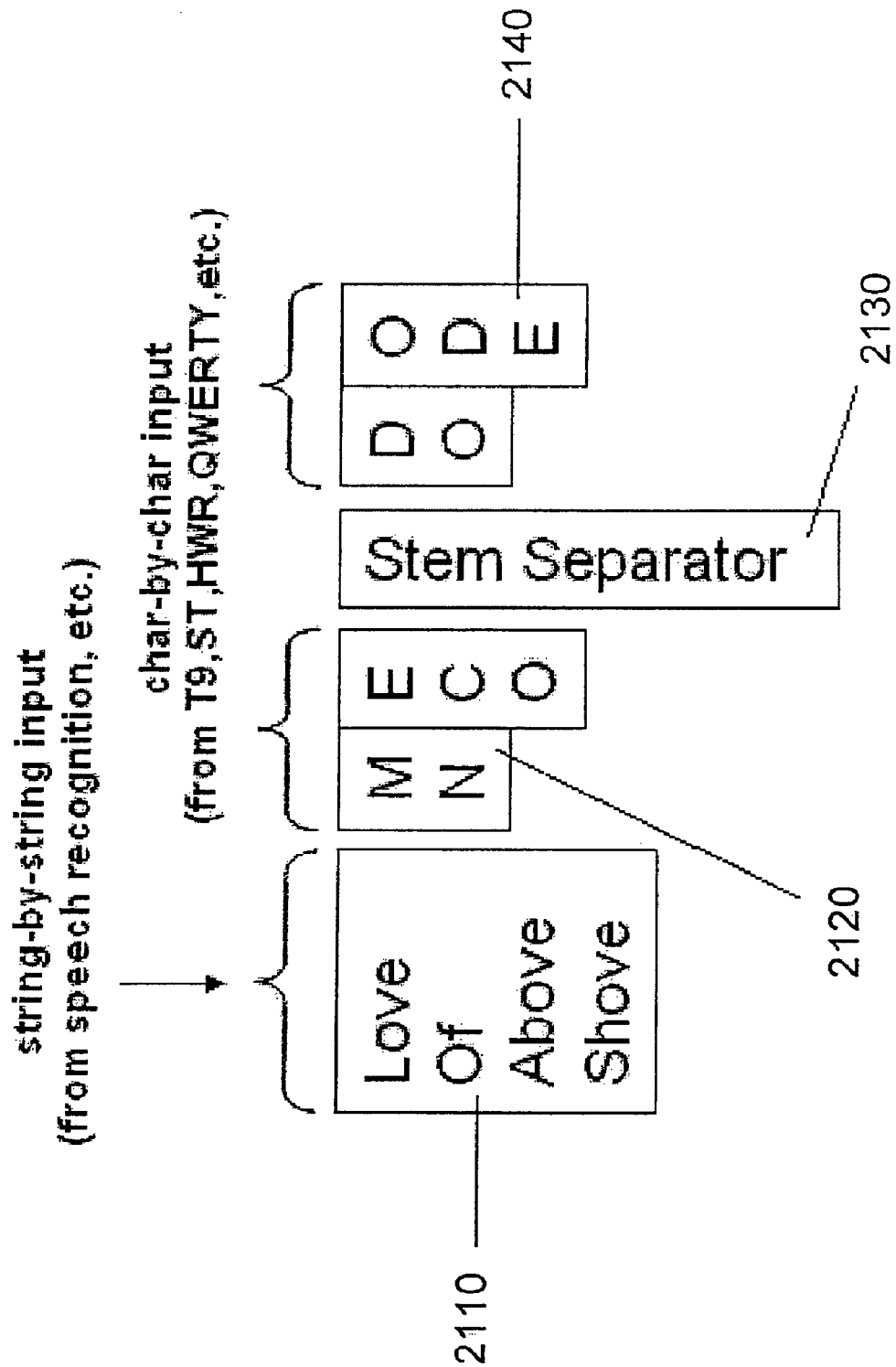
FIG. 21 illustrates a search structure generated by a multimode application.

FIG. 21 illustrates a search structure 2100 generated by a multi-mode retrieval application using multi-mode input. The first portion 2110 displays a list of possible interpretations after a spoken word has been analyzed. More precisely, the first portion 2110 represent the list of interpretations from analyzing the spoken word using an audio dictionary. As shown in search structure 2100, a term appearing to end with the sound "ove" has been spoken with "Love", "of", "above", and "shove" being identified as potential results.

The second portion 2120 displays potential results for two inputted characters received as a handwritten string. As shown, the multi-mode application has resolved the handwritten string to either "m" or "n" followed by one of "e", "c", or "o".

The third portion 2130 displays potential results after receipt of a separator to designate entry of a new stem. For example, a user may enter a "#" key to indicate a beginning of the next stem. In one implementation, changing the input modality (e.g., changing from voice input to key input) also may be used to enter or imply a separator. The fourth portion 2140 displays potential results after entry of a final stem. For example, a user may return to handwriting recognition to enter input. As shown, GUI 2100 indicates that the fourth portion has been resolved to either "D" or "O" followed by one of "O", "D", or "E". A wireless phone then may use the three ambiguous inputs to retrieve results responsive to a user's predicted interest. As a result, although ambiguous interpretations related to some of the input may be more likely to introduce unwanted results than other input, a wireless phone performing multi-mode analysis may determine that the results related to the string "Love me do", and, therefore, likely relates to a popular song by the Beatles.

In various implementations, the analytic engine may use metrics associated with the entered input and stems to determine a numerical value (e.g., a probability) that one of multiple matching stems is the stem the user is seeking. For example, the terms 3210 'Love,' 'Of,' 'Above,' and 'Shove,' may each be associated with a specific probability, and the presentation of the multiple matches may reflect the associated probability so as to bring terms that are more likely desired to the attention of the user.

Figure 22:
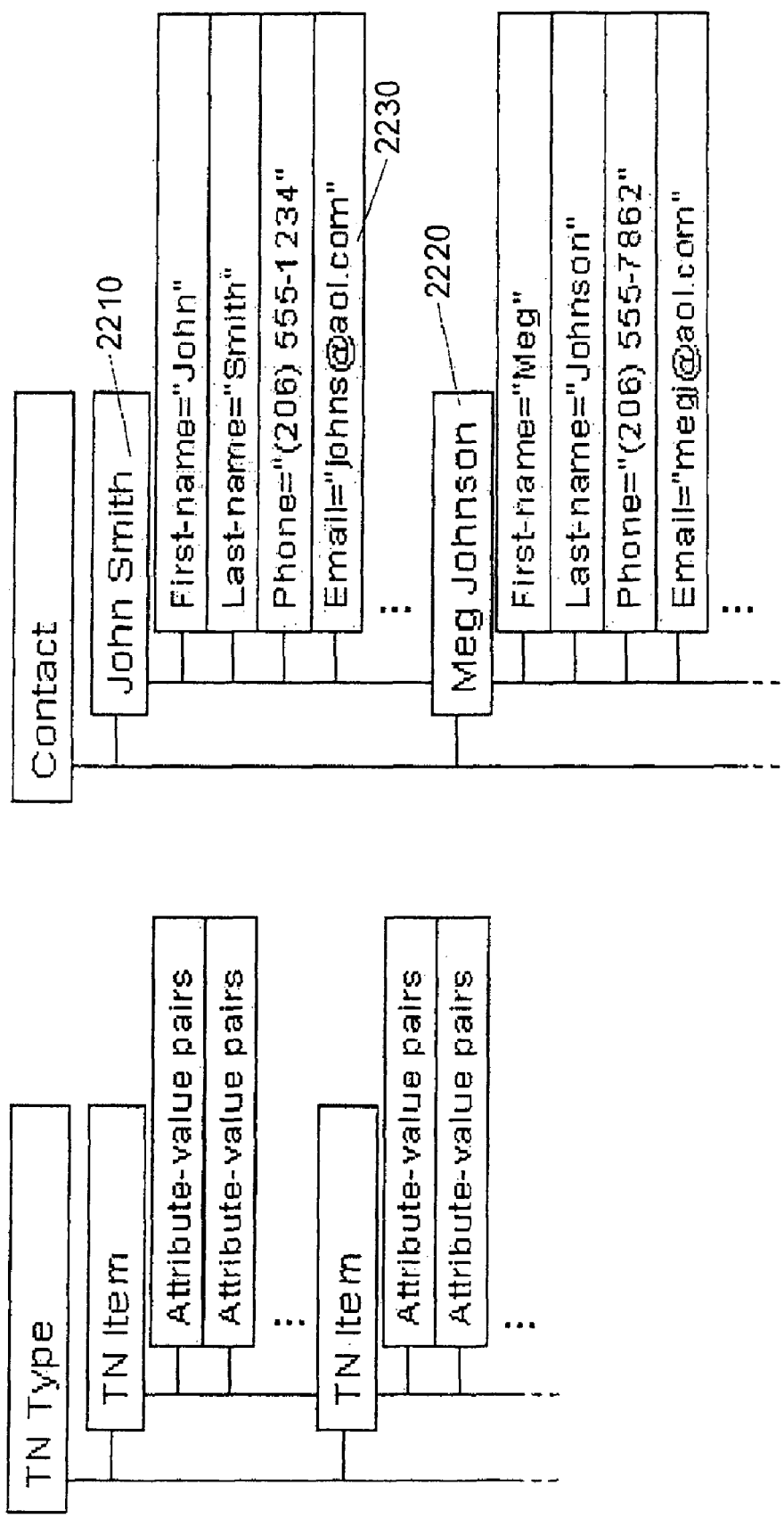
FIG. 22 illustrates a diagram with attribute-value pairs.

Referring to FIG. 22, searches may be structured as shown in the diagram 2200, where text or terms are searched within the value portion of attribute-value pairs. The results returned as responsive to a search (e.g., matching) may appear in various forms, such as rendering a specific contact entry (or a portion thereof). For example, an email address, name, or number in an attribute-value pair may be returned as a result to a search. In this manner, if a user searches using '5646' (John), a name or email address may be returned and rendered in results. A user may not be required to enter an '@' symbol to designate that John's email address 2230 is requested. If a user enters "555" on an alphanumeric keypad, the two contacts 2210 and 2220 in the diagram 2200 may be returned as results as the user's input relates to both contacts' phone numbers.

In implementations using an attribute-value pair-based data structure, an attribute-value pair may be configured and/or created in a storage that is updated to reflect a user's search and use of the analytic engine. For example, a vendor providing photo-album software may use an attribute-value pair structures to access and manipulate a database of photos stored on the device. The attribute-value pairs may specify parameters useful in manipulating the database of photos. Each photo may have an attribute-value structure that specifies a photo name, a photo date, and a photo file type. The analytical engine accessing the database may specify that inputted characters may be related to a photo name and date, but not the photo type. Thus, the analytic engine may be configured to act in a particular manner based on an underlying type of data or program used to access the data.

Attribute-value pairs also may be individually associated with specific actions. For example, in the diagram 2200, the entry for contact John Smith 2210 includes an attribute-value pair for an email address 2230. The email address 2230 may be associated with a specific action of "email this contact" such that when the email address 2230 is selected as a matching term to an ambiguous search, the "email this contact" action is presented as an option. In one implementation, a set of actions may use a parameter or action group that is associated with a specific data type. For example, a set of actions related to phone numbers may be represented as a telephony action group (e.g., "Call x phone number" and "Send text message to x phone number") and may be registered as "members" of the phone numbers action group. In some implementations, the available actions and/or action groups may be added to an application or modified within an application. Further related actions may be grouped and presented together. For example, if a user enters input related to an action item "SMS", a related action item "New SMS" may be presented based when results related to the input are entered.

Figure 23:
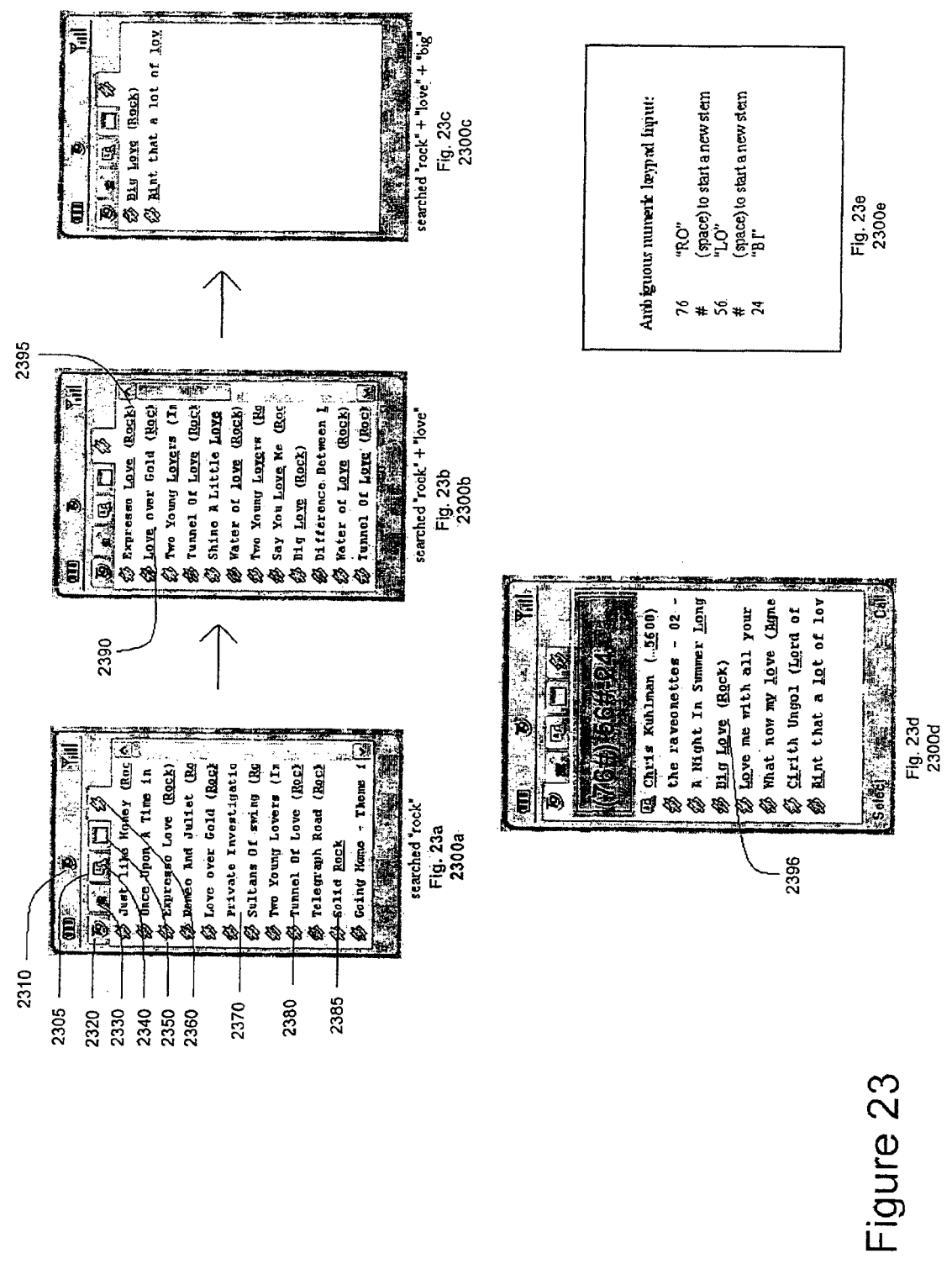

FIGS. 23*a*-23*e* illustrate how a mobile device may be configured to present information with a tabbed user interface enabling results to be sorted. In particular, FIGS. 23*a*-23*d* illustrate a sequence of GUIs presented to a user in response to receiving an input sequence from a keypad. FIG. 23*e* illustrates how the input presented to the mobile device shown in FIGS. 23*a*-23*d* may be structured using tabs to organize results.

FIGS. 23*a*-23*e* also illustrate how a mobile device, such as a wireless phone, may include a multi-stem analytic engine configured to perform multi-stem analysis. The multi-stem analytic engine is configured to analyze input entered as one or more stems where the different stems may be distributed at different locations within a string. More precisely, the multi-stem analytic engine is configured to provide results based on the entered stems, even though one or more non-inputted characters may be located between inputted data (e.g., characters). For example, a multi-stem analytic engine may be configured to determine the occurrence of the inputted characters (e.g., matching, substitute or similar characters) in a library of candidates. The library of candidates may include a name, a title, a description, or content. The candidates also may include a file, an entry, and/or a record. A identified stem found in the library of candidates need not occur starting with the first character in a group of characters.

FIG. 23*a* illustrates a mobile device with a GUI 2300*a* configured to render results using a tabbed user interface. The disambiguating code icon 2310 at the top of GUI 2300*a* indicates that a disambiguating application has been invoked. The disambiguating application (e.g., analytic engine) is an application configured to present results based on user input that may include at least some multi-mode characters. For example, the disambiguating application may be used to process a sequence of inputted characters from a keypad on a wireless phone.

The tabbed user interface 2305 enables a user to filter results by a type that appears on the tab. More precisely, selecting a tab associated with a type enables the user to further narrow results so that only results associated with the type indicated on the tab are displayed. An "all" tab 2320 displays results irrespective of the underlying types of data or application. A "contacts" tab 2330 displays the results that pertain to contact information (e.g., names and telephone number entries). A calendar tab 2340 displays the results that pertain to calendar information (e.g., meetings or event notices). An "application" tab 2350 displays the results that pertain to one or more types of applications (e.g., a game or a calculator). A "media" tab 2360 displays the results that pertain to media file types (e.g., music files). A "carrier" tab (not shown) displays the results that pertain to content, services, and promotions offered by the wireless carrier.

The results display 2370 displays results that pertain to the selected tab in the form of individual entries 2380 (e.g., entry 2380, entry 2385). On the left of each entry 2380 is an application icon 2390 that is associated with the selected tab (e.g., a media player icon for a mobile "Winamp" player is associated with filtering launched and depicted by media tab 2360). Although GUI 2300*a* illustrates only one application icon responsive to the "media tab" 2360, multiple applications (and application icons) may be presented in response to selecting a tab on a tabbed user interface. For example, multiple files associated with different media player applications may be presented in response to selecting a media tab that is not specific to the media player. As shown in FIG. 23*a*, the term "Rock" has been underlined to indicate that results responsive to "rock" have been entered. FIG. 23b illustrates results presented in GUI 2300b based on use of a multi-stem analytic engine. In particular, GUI 2300b includes underlined words "Love" 2390 and "Rock" 2395 that represent two separate "matching" stems determined to be responsive to inputted characters that have been entered as two stems. The results shown in GUI 2300b based on two stems represent more narrowed results than the results shown in GUI 2300a based on a single stem. The results based on three stems further narrows results are shown in GUI 2300c in FIG. 23c.

FIG. 23d illustrates GUI 2300d, demonstrating how the "all" tab 2320 may be selected to return results from two or more types of applications or data. In GUI 2300d, the rock song "Big Love" 2396 represents one of the potential results rendered in response to the multiple stems entered by keys "7", "6", "#", "5", "6", "#", "2", and "4." The mobile device identified results based on a first stem with "2" and "4" as including "Big" in the song title. Based on the second stem "5" and "6", the analytic engine identified a result that included "Love" in the song title. Based on the third stem "7" and "6", the analytic engine identified a result with "Rock" in the song description. FIG. 23e illustrates the keys entered in the ambiguous multi-stem search and the associated characters intended to be searched on the mobile device of FIG. 23d.

Figure 24:
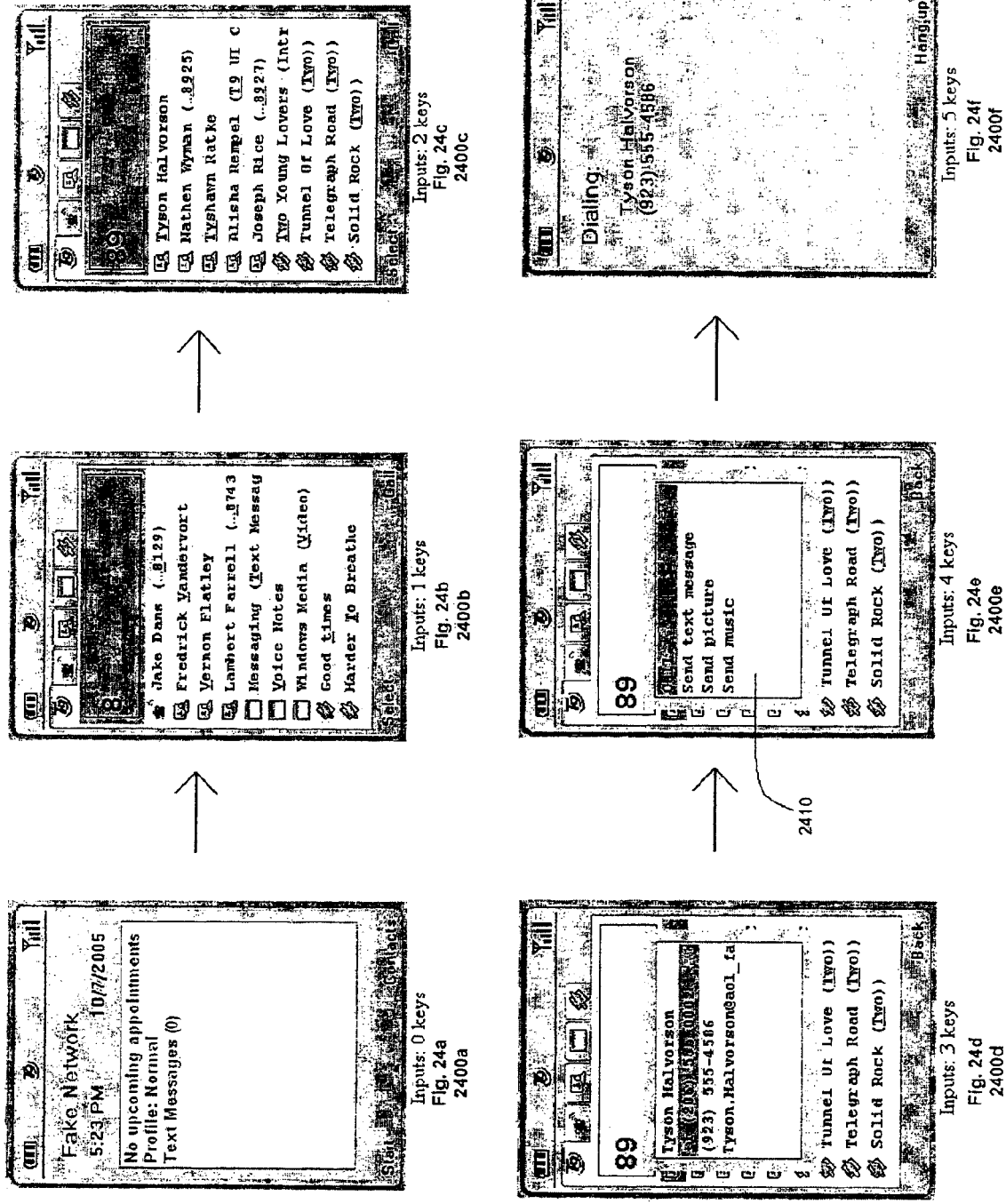
FIGS. 24a-24f illustrate a sequence of graphical user interfaces enabling a user to use multiple input modes to invoke an operation.

FIG. 24a illustrates GUI 2400a representing an initial display of a mobile device that includes a tabbed user interface configured to sort results into multiple predetermined types of data or applications (when user inputs are received as shown in FIGS. 24b-24f). A user presented with GUI 2400a enters input on a wireless phone that performs multi-stem analysis of the entered input (e.g., by searching media files or phonebook entries). Results may be initially displayed in a tabbed user interface with the "all" tab selected as a default setting as shown in GUI 2400b of FIG. 24b. GUI 2400b illustrates how the multi-stem analysis revises the results in response to subsequently receiving additional user input. More precisely, GUI 2400b illustrates results that are presented after the '8' key has been selected on a keypad of a wireless phone.

FIG. 24c illustrates GUI 2400c after a second input has been entered. In particular, GUI 2400c represents the results presented in response to user entry of the '9' key and "8" has already been entered.

As shown in FIG. 24d, GUI 2400d illustrates that the user has selected the first result shown on GUI 2400c, "Tyson Halvorson", and has been presented with information associated with that contact. For example, a user may interact with a touch screen on a wireless phone when presented with GUI 2400c in order to invoke GUI 2400d. The presented attributes are those which the user can choose one or more actions for. Alternatively, the "Contacts" application may be invoked so the selected contact record may be edited.

In FIG. 24e, GUI 2400e illustrates how selecting one of the contact's attributes presented in GUI 2400d may result in a list of options appropriate to the selected attribute. After being presented with GUI 2400d, the user selects an entry to access additional options shown in GUI 2400e. For example, the user may elect to call the number, send a text message, send a picture, and/or send music. After selecting "call", FIG. 24f indicates how a wireless phone begins "dialing".

The list of options may be sorted based on likelihood of use, and may be reordered if the user chooses one option more frequently than the others. Alternately, each listed attribute has one or more possible options that may be displayed, as FIG. 24d illustrates with respect to the "Call (923)555-4586" option is invoked immediately upon selection (or confirmation). In another implementation, selecting an option associated with a menu item in a hierarchical menu system or application places the user at that position in the menu hierarchy or application as if the user had navigated to it through all the intervening steps.

Portions of results responsive to an active stem, that is, the stem currently being entered and edited, may be underlined with a specific color. Other portions responsive to previously-entered stems (e.g., a passive stem) may be underlined in a different color (or the portions may not be underlined at all). Other implementations may distinguish active stems in other ways, such as using bold text, italics, varying the text size, and/or selectively presenting portions of an entry responsive to the stems that have been entered and also that provide the user meaningful contextual information.

Figure 25:
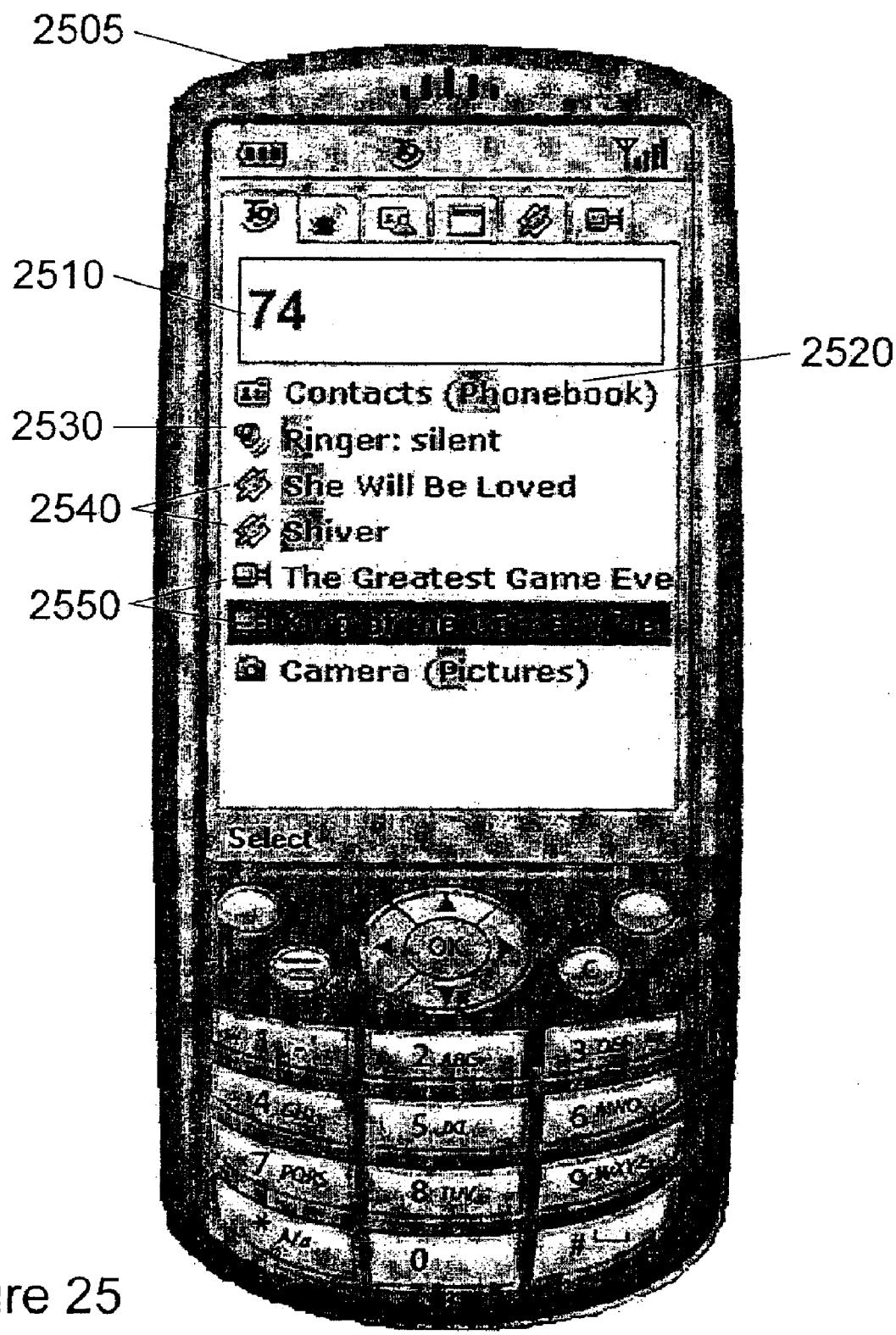
FIG. 25 illustrates a mobile device configured to use search result sorting and rendering techniques.

Referring to FIG. 25, a GUI 2500 on a device 2505 illustrates how results may be sorted and rendered. In the GUI 2500, a user has entered the keys '7' and '4' as input. The device has rendered the inputted term "74" in portion 2510 to provide the user an indication of the characters that have been entered.

Working independently or with a host, the device 2505 identifies results, and determines an order or priority for the identified results. In one implementation, the frequency of use for an entry determines the relative prominence with which the result is displayed. Specifically, information associated with how often the device or user has selected the particular entry is used to sort the results. Variations on frequency sorting may include decaying the weighted frequency over time. Specifically, the length of time that has elapsed since a previous selection may be used to revise the ordering that is rendered. Also, a list of high frequency items may be maintained and used when sorting. Items that have been used a threshold degree of times (particularly for a threshold length of time) may be elevated over other results that have not been selected the threshold degree of times (or as many times as other results).

In one implementation, each instance in which an entry in the results is selected increments a frequency counter associated with the entry. The frequency counter affects the sorting of subsequent searches. After a threshold number of selections have been performed, or after a threshold amount of time, all the frequencies may be "aged" by subtracting or dividing the frequency by a constant number.

Also, the device 2505 may use context information (e.g., time of day, day of week, wireless-tower-ids in range, user presence information like "In a Meeting", present applications in use, etc.) with the user's input to predict items the user is likely to be interested in based on the user's past selection behavior. For example, if the device is searching within a photo album program, picture files related to the entered term may be elevated in the display above other, non-photo-related entries. In some implementations, contextual information is used to sort which items are even referenced by the analytic engine.

Further, the device 2505 may use input-weighted frequency to determine the likelihood that a candidate is related to the entered input. For example, a handwritten entry may be interpreted as intended to refer to either an 'e', 'c' or 'o' with probabilities of 0.6, 0.3, and 0.1, respectively. Items matching an 'e' may be presented before or more prominently then items matching a 'c' or and 'o.' Also, a weighted relevancy may be attached to items. For example, phone book entries may be given a highly relevant weight, such as a 0.9, where stored media files may be given a lower weight, such as 0.1. Weighted relevancy may be used to determine the order or display of matching items. In various implementations, an n-best list is used which includes a list of potential interpretations of an ambiguous input, where each interpretation may be paired with a quantity indicating an input probability. The paired probabilities may be assigned by the analytic engine, or set to constants, as with the example above. N-best lists may include a single character n-best list and a single word n-best lists. In various implementations, the likelihood of a match, input-weighted frequency, or a relevancy weight may be used to identify and/or order results, for example, as part of an ordering scheme for a list of items responsive to the currently entered text. Individual attributes (e.g., fields in a database record) may be relied upon more frequently than others and gain a more relevant weight for future searches. For example, as the user frequently selects a result matching a co-worker's 4-digit extension, the office phone number attribute gradually becomes more relevant than others and, in turn, objects that include attributes related to the 4-digit extension receive an increased weighting, thereby moving higher in the results.

Various statistical calculations may be used to reduce the computational complexity used to identify results. In one implementation, an operation using log2 of the probability of a n-best list item minus the log2 of the probability of the most probable item in an n-best list, may be used as the value by which each n-best list item is ranked (and thus displayed relative to other results). Further, the likelihood that a given input sequence relates to an entry may be determined by raising 2 to the power of the summation of the quantity paired with each n-best entry matching the explicit input combination, and thus represent computationally similar results to results based on logarithmic properties.

In addition, a predetermined or default order may be used to sort or display results. For example, phone book items may always be displayed ahead of media file items. Also, a default order may be used as a secondary sorting criteria, such as, for example, used to distinguish between items of equal or similar relevance. For example, an alphabetic or chronological sorting may be used.

The above description includes various sorting and rendering techniques that may be used. Different implementations may use differing combinations of the above techniques. The device 2505 has used a combination of the above techniques to display results responsive to the inputted sequence appearing in portion 2510. The matches may be first sorted by type of item (e.g., entry in the phone book, audio file, multimedia file, etc.). In some implementations, display space is reserved to display one or more of multiple types of item matches. For example, the first three phone book entry matches are always returned as well as the first two audio file matches.

The "Contacts" item is displayed as a first match 2520 due to its frequency of use; in this case, the synonym "Phonebook" is matched rather than the manufacturer's name for the feature. The second match 2530 is an action item to silence the ringer. The third and fourth matches 2540 are media entries and may be ordered using a secondary sorting technique. Specifically, the third and fourth matches 2540 are further sorted using alphabetical indexing to determine their relative location in the display. Alternately, the results may be sorted by general popularity or by the number of times the user has played it or has listed it on multiple playlists. The fifth and sixth matches 2550 are multi-media entries and are ordered using a secondary sorting technique where matches to names of items are ordered above matches to categories or to descriptive terms of items.

In one implementation, the display is updated based on receipt of subsequent input. Specifically, as the user begins typing keys, the majority of the screen is devoted to presenting matches (as shown in the Fig.). As further inputs are entered and the number of matching items is reduced, portion 2510 may be increased (e.g., from 1 line to 3 lines) and the list of results is decreased (e.g., from 10 lines to 8 lines) (not shown). As the number of the matching items is reduced to zero, the matching list is decreased further or no longer rendered. Thus, a user has more available space for the input and/or to receive information about a particular entry appearing in the results. Similarly, the input sequence may be interpreted and shown on a portion of the display as predicted text (not shown), as if the user is entering a text message or memo. As further inputs are entered, and the number of matches decreases, the portion reserved for the text message interpretation expands. At that point, the device also may present actions associated with the text message interpretation, such as "save as memo" or "send an SMS."

Figure 26:
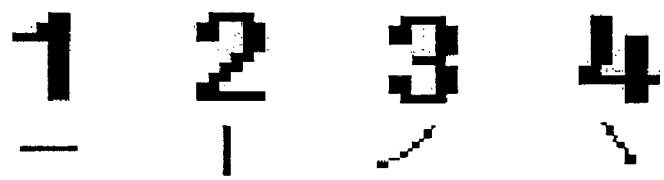
FIG. 26 illustrates an example of a GUI rendering ambiguous stroke input.
Figure 26:
Figure 26:

Referring to FIG. 26, GUI 2600 illustrates how ambiguous stroke input may be rendered. In the GUI 2600, a user has inputted keys representing strokes or stroke categories. The strokes may be used to enter characters in pictographic or ideographic languages such as Chinese. The GUI 2600 concurrently displays the stroke and the stroke number, key identifier, or other character associated with the stroke. The stroke is displayed below the number in entry mode 2610, superimposed over the number in entry mode 2620, and adjacent to the number in entry mode 2630. The various techniques described above also be used in conjunction with stroke inputs described in GUI 2600.

Furthermore, stems may be identified irrespective of the order in which the stems appear in the underlying record. For example, a first stem may be identified as relating to the end of a song title, and a subsequently-received stem may be identified as the beginning of the song title.

Although many of the operations were described as using the analytic engine to identify an entry, object, and/or record, the operations also may be used to identify an application. For example, the user may enter the character sequence '633' to access a "media player application."

The analytic engine may be configured to reference a dictionary of synonyms to identify results. For example, the analytic engine may be configured to recognize "stadium" as a synonym for "Safeco Field" (the home field of the Seattle Mariners). Thus, upon receiving "7423" as a sequence of characters, the analytic engine may determine that the user is attempting to enter the term "stadium". The analytic engine then may search a directory of addresses for entries that include the term "stadium". The analytic engine also may search the directory of addresses for entries related to "Safeco Field". Results related to stadium and also Safeco Field then may be displayed.

What is claimed is:

1. A method of presenting information to a user, the method comprising:
receiving a first input from a user;
structuring the first input as a first stem;
receiving a separator designating subsequently-received input as a second input;
receiving the second input;
structuring the second input as a second stem;
relating the first stem and the second stem to a library of candidates, further including searching a database of objects, each object being associated with one or more strings, by identifying matches between the first stem and a first string and the second stem and a second string, the first and second stems indicative of at least one of an object type or an application from the library of candidates;
rendering one or more results in response to relating the first stem and the second stem to the library of candidates the results including an indication of applications available for launch in conjunction with the results, including rendering an action as an object in the results related to a command accessible through a menu system;

transferring the user into the menu system so that the action may be commenced in response to receiving a confirmation instruction from the user; and enabling the user to select from among the one or more results, identifying matches between the first stem and the first string and the second stem and the second string including identifying matches between the first stem and the first string that appear in a first attribute and between the second stem and the second string that appear in a second attribute that is different than the first attribute.

2. The method of claim 1 wherein each of receiving the first input, the separator, and the second input includes receiving key inputs on a reduced-entry keypad.

3. The method of claim 2 wherein receiving the first and second inputs includes receiving one or more key inputs on a reduced entry keypad where one or more of the key inputs represents a plurality of possible characters.

4. The method of claim 1 wherein receiving the separator includes receiving the separator as a single key input on a reduced-entry keypad.

5. The method of claim 1 wherein receiving the first input or the second input includes receiving speech inputted by a user.

6. The method of claim 1 wherein identifying matches between the first stem and the first string and the second stem and the second string includes identifying matches between the first stem and the first string that appear as the first portion of a phrase of more than word and between the second stem and the second string that appear in a second portion of the phrase.

7. The method of claim 1 wherein rendering the one or more results in response to relating the first stem and the second stem to the list of candidates includes rendering the results ordered by the likelihood each object in the results represents the actual object desired by the user.

8. The method of claim 1 wherein rendering the one or more results in response to relating the first stem and the second stem to the library of candidates includes rendering an entry responsive to the first and second stems and an action associated with the entry object.

9. The method of claim 1 wherein receiving the separator includes receiving the separator in response to determining that the user has selected a different entry mode.

10. The method of claim 9 wherein determining that the user has selected the different entry mode includes determining that the user has switched from using voice input system to entering to using a keypad for input.

11. The method of claim 1 wherein receiving the first input includes receiving a sequence of characters that represents a word that has been completely entered.

12. The method of claim 1 wherein receiving the first input includes receiving a sequence of characters that represents a word that has been partially entered.

13. The method of claim 1 wherein relating the first stem and the second stem to the library of candidates includes:

associating a string with an object that includes a synonym for a string already associated with an object; and identifying the object as one of the results based on determining that the first stem or second stem matches the string including the synonym.

14. The method of claim 1 further comprising:

sorting the results into two or more predetermined types of data or applications;

rendering the results in a tabbed user interface including multiple tabs that each correspond to the two or more predetermined types of data or applications;

enabling the user to select one of the multiple tabs; and enabling the user to perceive which of the results are selectively rendered responsive to the selected tab on the tabbed user interface.

15. The method of claim 1 further comprising automatically commencing the action related to the command accessible through the menu system in response to receiving a selection from the user.

16. The method of claim 1 further comprising:

designating an active stem presently being entered that may be updated through receipt of additional input; and identifying the active stem within an object as the results as the results are rendered.

17. The method of claim 16 further comprising distinguishing the active stem from a passive stem using a special graphical designator.

18. The method of claim 17 wherein distinguishing the active stem from the passive stem includes underlining the active stem in the object using a first color and underlining the passive stem in the object using a second color.

19. The method of claim 1 further comprising:

determining that the first stem or the second stem is found within a particular attribute for an object in the library of candidates;

using a display metric for the object that is based on determining whether the first stem or the second stem is found within the particular attribute for the object;

using the display metric to determine an order in which the results are rendered; and rendering the results based on the order.

20. The method of claim 19 further comprising adjusting the display metric to reflect that an object has been selected by the user.

21. The method of claim 19 further comprising adjusting a display metric for other objects associated with the particular attribute based on a determination that the user is prefers to input data related to the particular attribute.

22. The method of claim 1 further comprising: determining a character likelihood metric for each of one or more characters appearing within the first stem;

determining an object likelihood metric for different objects related to the stem using the character likelihood metric;

using the object likelihood metric to determine an order in which results are rendered; and rendering the results based on the order.

23. The method of claim 1 further comprising:

receiving additional input;

structuring the additional input as one or more additional stems;

relating the first stem, the second stem, and the additional stems to the library of candidates; and updating the rendered results in response to receiving the additional input.

24. A method of presenting information to a user, the method comprising:

receiving input from a user;

structuring the input as a plurality stems;

relating the stems to a library of candidates;

determining that the stems are found within a particular attribute for an object in the library of candidates, each stem of the plurality of stems indicative of at least one of an object type or an application from the library of candidates;

using a display metric for the object that is based on determining whether the stems are found within the particular attribute for the object;
using the display metric to determine an order in which the results are rendered; and
rendering the results based on the order, receiving the input for structuring as stems including receiving key inputs on a wireless phone, the results including an indication of applications available for launch in conjunction with the results, including rendering an action as an object in the results related to a command accessible through a menu system;
transferring the user into the menu system so that the action may be commenced in response to receiving a confirmation instruction from the user; and
enabling the user to select from among the one or more results, identifying matches between the first stem and the first string and the second stem and the second string including identifying matches between the first stem and the first string that appear in a first attribute and between the second stem and the second string that appear in a second attribute that is different than the first attribute.

25. A method of presenting information to a user, the method comprising:
receiving an input from a user;
structuring the input as a plurality of stems;
relating the stems to a library of candidates;
determining a character likelihood metric for each of one or more characters appearing within the stems;
determining an object likelihood metric for different objects related to the stems using the character likelihood metric, each stem of the plurality of stems indicative of at least one of an object type or an application from the library of candidates;
using the object likelihood metric to determine an order in which results are rendered; and
rendering the results based on the order, receiving the input for structuring as stems including receiving key inputs on a wireless phone, the results including an indication of applications available for launch in conjunction with the results, including rendering an action as an object in the results related to a command accessible through a menu system;
transferring the user into the menu system so that the action may be commenced in response to receiving a confirmation instruction from the user; and
enabling the user to select from among the one or more results, identifying matches between the first stem and the first string and the second stem and the second string including identifying matches between the first stem and the first string that appear in a first attribute and between the second stem and the second string that appear in a second attribute that is different than the first attribute.

26. A system that presents information to a user, the system including instructions that, when executed by a processor, cause the processor to:
receive a first input from a user;
structure the first input as a first stem;
receive a separator designating subsequently-received input as a second input;
receive the second input;
structure the second input as a second stem;
relate the first stem and the second stem to a library of candidates, the first and second stems indicative of at least one of an object type or an application from the library of candidates;
render one or more results in response to relating the first stem and the second stem to the library of candidates, the results including an indication of applications available for launch in conjunction with the results, the system structured and arranged to render an action as an object in the results related to a command accessible through a menu system; and
enable the user to select from among the one or more results, each of receiving the first input, the separator, and the second input including receiving key inputs on a wireless phone, the system structured and arranged to transfer the user into the menu system so that the action may be commenced in response to receiving a confirmation instruction from the user.

27. The system of claim 26 wherein receiving the first and second inputs includes receiving one or more key inputs on a reduced entry keypad where one or more of the key inputs represents a plurality of possible characters.

28. The system of claim 26 wherein receiving the separator includes receiving the separator as a single key input on a reduced-entry keypad.

29. The system of claim 26 wherein receiving the first input or the second input includes receiving speech inputted by a user.

30. The system of claim 26 wherein relating the first stem and the second stem to the library of candidates includes searching a database of objects, where each object is associated with one or more strings, by identifying matches between the first stem and a first string and the second stem and a second string.

31. The system of claim 30 wherein identifying matches between the first stem and the first string and the second stem and the second string includes identifying matches between the first stem and the first string that appear as the first portion of a phrase of more than word and between the second stem and the second string that appear in a second portion of the phrase.

32. The system of claim 30 wherein identifying matches between the first stem and the first string and the second stem and the second string includes identifying matches between the first stem and the first string that appear in a first attribute and between the second stem and the second string that appear in a second attribute that is different than the first attribute.

33. The system of claim 26 wherein rendering the one or more results in response to relating the first stem and the second stem to the list of candidates includes rendering the results ordered by the likelihood each object in the results represents the actual object desired by the user.

34. The system of claim 26 wherein rendering the one or more results in response to relating the first stem and the second stem to the library of candidates includes rendering an entry responsive to the first and second stems and an action associated with the entry object.

35. The system of claim 26 wherein receiving the separator includes receiving the separator in response to determining that the user has selected a different entry mode.

36. The system of claim 35 wherein determining that the user has selected the different entry mode includes determining that the user has switched from using voice input system to entering to using a keypad for input.

37. The system of claim 26 wherein receiving the first input includes receiving a sequence of characters that represents a word that has been completely entered.

38. The system of claim 26 wherein receiving the first input includes receiving a sequence of characters that represents a word that has been partially entered.

39. The system of claim 26 wherein relating the first stem and the second stem to the library of candidates includes:
associating a string with an object that includes a synonym for a string already associated with an object; and
identifying the object as one of the results based on determining that the first stem or second stem matches the string including the synonym.

40. The system of claim 26 wherein the system is structured and arranged to:
sort the results into two or more predetermined types of data or applications;
render the results in a tabbed user interface including multiple tabs that each correspond to the two or more predetermined types of data or applications;
enable the user to select one of the multiple tabs; and
enable the user to perceive which of the results are selectively rendered responsive to the selected tab on the tabbed user interface.

41. The system of claim 26 wherein the system is structured and arranged to automatically commence the action related to the command accessible through the menu system in response to receiving a selection from the user.

42. The system of claim 26 wherein the system is structured and arranged to: designate an active stem presently being entered that may be updated through receipt of additional input; and identify the active stem within an object as the results as the results are rendered.

43. The system of claim 42 wherein the system is structured and arranged to distinguish the active stem from a passive stem using a special graphical designator.

44. The system of claim 43 wherein distinguishing the active stem from the passive stem includes underlining the active stem in the object using a first color and underlining the passive stem in the object using a second color.

45. The system of claim 26 wherein the system is structured and arranged to:
determine that the first stem or the second stem is found within a particular attribute for an object in the library of candidates;
use a display metric for the object that is based on determining whether the first stem or the second stem is found within the particular attribute for the object;
use the display metric to determine an order in which the results are rendered; and
render the results based on the order.

46. The system of claim 45 wherein the system is structured and arranged to adjust the display metric to reflect that an object has been selected by the user.

47. The system of claim 45 wherein the system is structured and arranged to adjust the display metric for other objects associated with the particular attribute based on a determination that the user is prefers to input data related to the particular attribute.

48. The system of claim 26 wherein the system is structured and arranged to:
determine a character likelihood metric for each of one or more characters appearing within the first stem;
determine an object likelihood metric for different objects related to the stem using the character likelihood metric;
use the object likelihood metric to determine an order in which results are rendered; and
render the results based on the order.

49. The system of claim 26 the system is structured and arranged to:
receive additional input;
structure the additional input as one or more additional stems;
relate the first stem, the second stem, and the additional stems to the library of candidates; and
update the rendered results in response to receiving the additional input.

50. A system that presents information to a user, the system including instructions that, when executed by a processor, cause the processor to: receive input from a user;
structure the input as a plurality of stems;
relate the stems to a library of candidates;
determine that the stems are found within a particular attribute for an object in the library of candidates, each stem of the plurality of stems indicative of at least one of an object type or an application from the library of candidates;
use a display metric for the object that is based on determining whether the stems are found within the particular attribute for the object;
use the display metric to determine an order in which the results are rendered;
render the results based on the order, receiving the input for structuring as stems including receiving key inputs on a wireless phone, the results including an indication of applications available for launch in conjunction with the results, the system structured and arranged to render an action as an object in the results related to a command accessible through a menu system; and
enable the user to select from among the one or more results, each of receiving the first input, the separator, and the second input including receiving key inputs on a wireless phone, the system structured and arranged to transfer the user into the menu system so that the action may be commenced in response to receiving a confirmation instruction from the user.

51. A system that presents information to a user, the system including instructions that, when executed by a processor, cause the processor to:
receive a first input from a user;
structure the first input as a plurality of stems;
relate the stems to a library of candidates;
determine a character likelihood metric for each of one or more characters appearing within the stems, each stem of the plurality of stems indicative of at least one of an object type or an application from the library of candidates;
determine an object likelihood metric for different objects related to the stems using the character likelihood metric;
use the object likelihood metric to determine an order in which results are rendered; and
render the results based on the order, receiving the first input for structuring as stems including receiving key inputs on a wireless phone the results including an indication of applications available for launch in conjunction with the results, the system structured and arranged to render an action as an object in the results related to a command accessible through a menu system; and
enable the user to select from among the one or more results, each of receiving the first input, the separator, and the second input including receiving key inputs on a wireless phone, the system structured and arranged to transfer the user into the menu system so that the action may be commenced in response to receiving a confirmation instruction from the user.

52. The system of claim 26 wherein the processor is further configured to:

receive the selection, the selection indicative of an application to which the first stem or the second stem corresponds; and launch the corresponding application related to the selection.

53. The system of claim 52 wherein the selected application is configured for:
displaying a tiled view of a plurality of video streams for simultaneous review by a user;
receiving a selection of one of the tiled video streams; and
switching the display to render only the video stream corresponding to the received selection.

54. The system of claim 53 wherein the tiled view receives each of the plurality of video streams at a bandwidth subdivided among the plurality to tiled views, and
displays the selected vides stream at an increased bandwidth.

55. The method of claim 1 wherein relating further comprises performing multi stem analysis on the first stem and the second stem, including selective invocation of an application in response to a plurality of entered stems by:
rendering a default group of objects and applications responsive to an initial stem;
receiving a subsequent stem of multi-stem input; and
rendering an active group of object and applications indicative of a subset of the default group of objects and applications corresponding to the subsequent stem and the initial stem.

56. The method of claim 55 wherein launching further comprises invoking an application corresponding to the initially entered stem, the application responsive to the subsequent stem.

57. The method of claim 55 further comprising:
receiving additional subsequent stems as active stems;
rendering successive subsets of applications and objects, the successive subsets corresponding to the active stem and each previously entered stem; and
distinguishing the applications and objects corresponding to the active stem with different visual presentations than the rendered objects and applications matching previously entered stems.

58. The method of claim 1 further comprising launching an application associated with the rendered results responsive to a received user selection.

59. The method of claim 58 further comprising receiving the separator as a user input delimiting the first input and designating the second input.

* * * * *